US008313644B2

(12) United States Patent
Harris et al.

(10) Patent No.: US 8,313,644 B2
(45) Date of Patent: Nov. 20, 2012

(54) BOTTLE WITH AN INTEGRATED FILTRATION ASSEMBLY THAT IS MANUALLY OPERATED USING A PLUNGER

(75) Inventors: Jordan Harris, Belvedere, CA (US); Roo Rogers, New York, NY (US); Yves Behar, San Francisco, CA (US); Joshua Morenstein, San Francisco, CA (US); Serge Beaulieu, San Francisco, CA (US); Jennifer Olson, Brooklyn, NY (US)

(73) Assignee: OZOlab, New York, NY (US)

( * ) Notice: Subject to any disclaimer, the term of this patent is extended or adjusted under 35 U.S.C. 154(b) by 422 days.

(21) Appl. No.: 12/687,050

(22) Filed: Jan. 13, 2010

(65) Prior Publication Data

US 2011/0168644 A1    Jul. 14, 2011

(51) Int. Cl.
*B01D 24/30*    (2006.01)
*A47J 31/20*    (2006.01)
(52) U.S. Cl. ............ 210/198.1; 210/205; 210/232; 210/244; 210/246; 210/282; 210/359; 210/398; 210/416.3; 210/502.1; 99/297
(58) Field of Classification Search .............. 99/297
See application file for complete search history.

(56) References Cited

U.S. PATENT DOCUMENTS

| 492,161 A | 2/1893 | Hill | 210/414 |
|---|---|---|---|
| 593,333 A | 11/1897 | Park | 210/518 |
| 607,409 A | 7/1898 | Falardeau | 99/284 |
| 626,238 A | 6/1899 | Knapp | 210/244 |
| 647,580 A | 4/1900 | Parker | 210/467 |
| 690,457 A | 1/1902 | Parker | 210/244 |
| 703,654 A | 7/1902 | Hall | 222/189.11 |
| 704,586 A | 7/1902 | Sexton | 210/244 |
| 707,873 A | 8/1902 | Spencer | 210/472 |
| 728,426 A | 5/1903 | Timar | 215/308 |
| 872,407 A | 12/1907 | Donahoe | 210/467 |
| 920,791 A | 5/1909 | Tonini | 215/308 |
| 929,990 A | 8/1909 | Shields | 222/209 |

(Continued)

FOREIGN PATENT DOCUMENTS

EP    0297441    1/1989

(Continued)

OTHER PUBLICATIONS

Patent Cooperation Treaty. Form PCT/ISA/210, Internationai Search Report for PCT/US2011/021151, Oct. 31, 2011, pp. 1-3.

*Primary Examiner* — Robert James Popovics
(74) *Attorney, Agent, or Firm* — Pillsbury Winthrop Shaw Pittman LLP

(57) ABSTRACT

A portable vessel for fluids has an integrated filtration system. A pressing assembly fitted to the vessel includes a stopper, a rod having a top end and a filtration assembly. A vessel top receives the pressing assembly such that the rod of the pressing assembly is slidably attached to a bearing of the vessel top. A gasket attached to the filtration element maintains a seal between the inner surface of the vessel and an outer perimeter of the filtration assembly and the orientation of the rod is maintained by the gasket and the bearing. In use, pressure applied to the pressing assembly drives the filtration assembly through the vessel causing water to be filtered as it passes through the filter element.

12 Claims, 13 Drawing Sheets

U.S. PATENT DOCUMENTS

| | | | | |
|---|---|---|---|---|
| 1,053,735 A | * | 2/1913 | Lefevre | 99/297 |
| 1,164,453 A | * | 12/1915 | Belles | 222/189.07 |
| 1,213,319 A | * | 1/1917 | Whitaker | 215/364 |
| D52,019 S | * | 5/1918 | Biette | D7/310 |
| 1,372,715 A | * | 3/1921 | Morledge | 215/3 |
| 1,386,340 A | * | 8/1921 | Wuster | 210/359 |
| 1,510,863 A | * | 10/1924 | Rose | 210/413 |
| 1,637,103 A | * | 7/1927 | Corwin | 366/130 |
| 1,672,466 A | * | 6/1928 | Oshman et al. | 215/11.1 |
| 1,672,467 A | * | 6/1928 | Oshman et al. | 215/11.1 |
| 1,699,873 A | * | 1/1929 | Brodsky | 222/386 |
| 1,701,194 A | * | 2/1929 | Rosenstein et al. | 99/285 |
| 1,800,757 A | * | 4/1931 | Schlosser | 210/248 |
| 1,871,254 A | * | 8/1932 | Bryan | 210/514 |
| 1,873,023 A | * | 8/1932 | Peirce | 99/319 |
| 1,883,967 A | * | 10/1932 | Krause | 210/542 |
| 1,949,058 A | * | 2/1934 | Leguillon | 222/529 |
| 1,966,611 A | * | 7/1934 | Cobel | 222/189.07 |
| 1,987,037 A | * | 1/1935 | Unsinger | 210/517 |
| 1,994,656 A | * | 3/1935 | Liddell | 210/412 |
| 1,998,692 A | * | 4/1935 | Harrison et al. | 366/333 |
| 2,008,254 A | * | 7/1935 | Reinhold | 210/514 |
| 2,047,793 A | * | 7/1936 | McKinley | 210/412 |
| 2,052,941 A | * | 9/1936 | Prevost | 210/514 |
| 2,053,021 A | * | 9/1936 | Bruno | 99/287 |
| 2,055,096 A | * | 9/1936 | Dehn et al. | 210/466 |
| 2,071,565 A | * | 2/1937 | Overmyer | 210/517 |
| 2,112,233 A | * | 3/1938 | Teuniss | 210/514 |
| 2,126,655 A | * | 8/1938 | Neal | 210/518 |
| 2,181,612 A | * | 11/1939 | Smith | 222/189.08 |
| 2,186,041 A | * | 1/1940 | Posey | 210/517 |
| 2,207,294 A | * | 7/1940 | Hubner et al. | 239/327 |
| 2,222,511 A | * | 11/1940 | McAlister | 210/514 |
| 2,222,594 A | * | 11/1940 | Metcalf | 210/514 |
| 2,227,652 A | * | 1/1941 | Kilday | 99/455 |
| 2,249,487 A | * | 7/1941 | Musolf | 210/514 |
| 2,260,422 A | * | 10/1941 | Unsinger | 210/517 |
| 2,277,001 A | * | 3/1942 | Hanson | 210/516 |
| 2,279,419 A | * | 4/1942 | Teunisz | 210/514 |
| 2,288,532 A | * | 6/1942 | Knapp | 210/474 |
| 2,291,708 A | * | 8/1942 | Gluck | 366/260 |
| 2,338,417 A | * | 1/1944 | Forrest et al. | 210/412 |
| 2,338,418 A | * | 1/1944 | Forrest et al. | 210/412 |
| 2,338,419 A | * | 1/1944 | Forrest et al. | 210/412 |
| 2,344,485 A | * | 3/1944 | Adams | 210/514 |
| 2,389,185 A | * | 11/1945 | Dick | 210/472 |
| 2,418,630 A | * | 4/1947 | Febbraro | 215/316 |
| 2,436,077 A | * | 2/1948 | Robertson | 210/317 |
| 2,450,520 A | * | 10/1948 | Maddux | 210/244 |
| 2,473,986 A | * | 6/1949 | Booth | 210/228 |
| 2,481,352 A | * | 9/1949 | Sabatella | 366/260 |
| 2,502,298 A | * | 3/1950 | White | 141/387 |
| 2,541,524 A | * | 2/1951 | Leon | 210/472 |
| 2,558,987 A | * | 7/1951 | Shaw | 604/406 |
| 2,560,214 A | * | 7/1951 | Cameron | 99/319 |
| 2,562,433 A | * | 7/1951 | Moore | 99/319 |
| 2,566,371 A | * | 9/1951 | Quinn | 210/232 |
| 2,645,173 A | * | 7/1953 | McWatters | 99/319 |
| 2,649,205 A | * | 8/1953 | Quinn | 210/416.3 |
| 2,655,279 A | * | 10/1953 | Wolf | 215/11.5 |
| 2,670,081 A | * | 2/1954 | Quinn | 210/316 |
| 2,686,597 A | * | 8/1954 | Lilja | 210/469 |
| 2,726,071 A | * | 12/1955 | Bernhardt | 366/256 |
| 2,738,105 A | * | 3/1956 | Ogden et al. | 222/189.08 |
| 2,744,529 A | * | 5/1956 | Tichy | 215/11.4 |
| 2,749,834 A | * | 6/1956 | Hiscock | 99/287 |
| 2,761,833 A | * | 9/1956 | Ward | 210/85 |
| 2,767,871 A | * | 10/1956 | Shapiro | 215/11.5 |
| 2,774,518 A | * | 12/1956 | Greene | 222/209 |
| 2,779,472 A | * | 1/1957 | Febbraro | 210/514 |
| 2,781,312 A | * | 2/1957 | Klumb et al. | 210/94 |
| D181,143 S | * | 10/1957 | Gundelfinger et al. | D7/376 |
| 2,858,940 A | * | 11/1958 | Calvert | 210/516 |
| 2,868,203 A | * | 1/1959 | Tichy | 215/11.4 |
| 2,869,724 A | * | 1/1959 | McDevitt | 210/94 |
| 2,900,896 A | * | 8/1959 | Bondanini | 99/287 |
| 2,935,928 A | | 5/1960 | Keating et al. | |
| 3,010,583 A | * | 11/1961 | Kenyon | 210/406 |
| 3,038,610 A | * | 6/1962 | Hetherington | 210/96.1 |
| 3,137,228 A | * | 6/1964 | Elow | 99/287 |
| 3,149,758 A | * | 9/1964 | Bush et al. | 222/189.09 |
| 3,189,223 A | * | 6/1965 | Mackal | 222/1 |
| 3,220,555 A | * | 11/1965 | Silha | 210/282 |
| 3,307,474 A | * | 3/1967 | Kasher | 99/287 |
| 3,323,684 A | * | 6/1967 | Furrer et al. | 210/474 |
| 3,335,917 A | * | 8/1967 | Knight | 222/189.07 |
| 3,411,648 A | * | 11/1968 | Tichy | 215/11.4 |
| 3,413,908 A | * | 12/1968 | Nadelson | 99/297 |
| 3,441,160 A | * | 4/1969 | Milton | 215/11.1 |
| 3,512,940 A | * | 5/1970 | Shapiro | 422/535 |
| 3,546,129 A | * | 12/1970 | Youngdahl et al. | 366/176.3 |
| 3,657,993 A | * | 4/1972 | Close | 99/297 |
| 3,693,804 A | * | 9/1972 | Grover | 210/359 |
| 3,752,604 A | * | 8/1973 | Dorn | 417/511 |
| 3,799,342 A | * | 3/1974 | Greenspan | 210/780 |
| 3,802,843 A | * | 4/1974 | Kim | 422/71 |
| 3,814,258 A | * | 6/1974 | Ayres | 210/359 |
| 3,905,528 A | * | 9/1975 | Maiocco | 494/38 |
| 3,926,348 A | * | 12/1975 | Lutzker | 222/189.07 |
| 3,927,608 A | * | 12/1975 | Doyel | 99/297 |
| 3,951,798 A | * | 4/1976 | Haldopoulos | 210/452 |
| 3,977,560 A | * | 8/1976 | Stumpf et al. | 220/265 |
| 4,010,934 A | * | 3/1977 | McCord et al. | 366/142 |
| 4,019,984 A | * | 4/1977 | Mohn | 210/770 |
| 4,054,526 A | * | 10/1977 | Muller | 210/245 |
| 4,093,548 A | | 6/1978 | Sterkenburg et al. | |
| 4,127,486 A | * | 11/1978 | Hein et al. | 210/219 |
| 4,151,092 A | * | 4/1979 | Grimm et al. | 210/256 |
| 4,153,170 A | * | 5/1979 | Aquarian | 215/11.1 |
| 4,365,544 A | * | 12/1982 | Howitt | 99/297 |
| 4,441,996 A | * | 4/1984 | Hurst | 210/241 |
| 4,443,336 A | * | 4/1984 | Bennethum | 210/238 |
| 4,444,358 A | * | 4/1984 | Spohn et al. | 239/284.1 |
| 4,477,347 A | * | 10/1984 | Sylva | 210/232 |
| 4,494,668 A | * | 1/1985 | Lottick | 220/709 |
| 4,529,511 A | * | 7/1985 | Breeden et al. | 210/94 |
| 4,533,068 A | * | 8/1985 | Meierhoefer | 222/189.09 |
| 4,605,499 A | * | 8/1986 | Wise | 210/282 |
| 4,636,307 A | * | 1/1987 | Inoue et al. | 210/188 |
| 4,643,981 A | * | 2/1987 | Card | 436/500 |
| 4,650,583 A | * | 3/1987 | Bondanini | 210/474 |
| 4,673,501 A | * | 6/1987 | Wells et al. | 210/406 |
| 4,676,655 A | * | 6/1987 | Handler | 366/130 |
| 4,714,550 A | * | 12/1987 | Malson et al. | 210/244 |
| 4,737,036 A | * | 4/1988 | Offermann | 366/130 |
| 4,740,301 A | * | 4/1988 | Lopez | 210/321.87 |
| 4,744,477 A | * | 5/1988 | Wofford | 215/229 |
| 4,764,274 A | * | 8/1988 | Miller | 210/232 |
| 4,800,018 A | * | 1/1989 | Moser | 210/266 |
| 4,832,850 A | * | 5/1989 | Cais et al. | 210/638 |
| 4,859,336 A | * | 8/1989 | Savas et al. | 210/416.1 |
| 4,891,134 A | * | 1/1990 | Vcelka | 210/359 |
| 4,897,193 A | * | 1/1990 | Cais et al. | 210/359 |
| 4,909,932 A | * | 3/1990 | Monnet | 210/98 |
| 4,938,389 A | * | 7/1990 | Rossi et al. | 222/189.08 |
| 4,946,286 A | * | 8/1990 | Purkapile | 366/247 |
| 4,990,253 A | * | 2/1991 | Vcelka | 210/359 |
| D315,829 S | * | 4/1991 | Covington | D3/202 |
| 5,031,517 A | * | 7/1991 | Yeh | 99/319 |
| 5,038,793 A | * | 8/1991 | Guirguis | 600/573 |
| 5,060,483 A | * | 10/1991 | Heiland et al. | 62/123 |
| 5,106,500 A | * | 4/1992 | Hembree et al. | 210/266 |
| 5,114,858 A | * | 5/1992 | Williams et al. | 435/270 |
| 5,120,437 A | * | 6/1992 | Williams | 210/244 |
| 5,122,272 A | | 6/1992 | Iana et al. | |
| 5,130,015 A | * | 7/1992 | Simizu et al. | 210/136 |
| 5,139,666 A | * | 8/1992 | Charbonneau et al. | 210/264 |
| 5,167,819 A | * | 12/1992 | Iana et al. | 210/474 |
| 5,173,192 A | * | 12/1992 | Shalev | 210/767 |
| 5,200,070 A | * | 4/1993 | McMenamin | 210/206 |
| 5,211,973 A | | 5/1993 | Nohren | |
| 5,238,153 A | * | 8/1993 | Castillo et al. | 222/189.09 |
| 5,240,620 A | * | 8/1993 | Shalev | 210/767 |
| D342,414 S | * | 12/1993 | Jorgensen | D7/317 |
| 5,268,093 A | * | 12/1993 | Hembree et al. | 210/136 |
| 5,284,389 A | * | 2/1994 | Lumsden | 366/256 |
| 5,308,482 A | * | 5/1994 | Mead | 210/207 |

| | | | |
|---|---|---|---|
| 5,366,642 A * | 11/1994 | Platter et al. ............... 210/767 |
| 5,376,272 A * | 12/1994 | Spearman .................. 210/463 |
| 5,405,526 A * | 4/1995 | Sutera ......................... 210/124 |
| 5,415,774 A * | 5/1995 | Cowan et al. ............... 210/266 |
| 5,417,860 A * | 5/1995 | Kay ............................. 210/472 |
| 5,431,813 A | 7/1995 | Daniels |
| 5,431,816 A * | 7/1995 | Aldred et al. ............... 210/460 |
| 5,433,848 A * | 7/1995 | Platter et al. ............... 210/238 |
| 5,441,752 A * | 8/1995 | Sandin .......................... 426/82 |
| 5,453,189 A * | 9/1995 | Joergensen ................. 210/238 |
| 5,461,968 A * | 10/1995 | Portman ........................ 99/287 |
| 5,462,676 A | 10/1995 | Pitts |
| 5,478,586 A * | 12/1995 | Connor ........................ 426/431 |
| 5,497,920 A * | 3/1996 | Moeller et al. .............. 224/414 |
| 5,534,145 A * | 7/1996 | Platter et al. .................. 210/90 |
| D372,627 S * | 8/1996 | Ireland .......................... D7/319 |
| 5,544,566 A * | 8/1996 | Bersten ........................... 99/287 |
| 5,545,315 A | 8/1996 | Lonneman |
| 5,549,816 A * | 8/1996 | Harp et al. ................... 210/120 |
| 5,580,169 A * | 12/1996 | Ghidini ........................ 366/256 |
| 5,609,759 A * | 3/1997 | Nohren et al. ............... 210/266 |
| 5,614,236 A * | 3/1997 | Klang ........................... 426/112 |
| 5,616,242 A * | 4/1997 | Mandola ...................... 210/238 |
| 5,616,243 A * | 4/1997 | Levy ............................ 210/282 |
| 5,618,570 A * | 4/1997 | Banks et al. ................. 426/435 |
| 5,635,233 A * | 6/1997 | Levinson ..................... 426/433 |
| 5,653,878 A * | 8/1997 | Reid ............................. 210/266 |
| 5,685,980 A * | 11/1997 | Patapoff et al. .............. 210/244 |
| 5,688,397 A | 11/1997 | Malmborg |
| 5,709,794 A * | 1/1998 | Emmons et al. ............. 210/351 |
| 5,733,448 A | 3/1998 | Kaura |
| 5,770,074 A | 6/1998 | Pugh |
| 5,780,087 A * | 7/1998 | Brady ........................... 426/474 |
| 5,809,867 A | 9/1998 | Turner et al. |
| 5,830,359 A * | 11/1998 | Knight et al. ................ 210/651 |
| 5,840,185 A | 11/1998 | Hughes et al. |
| 5,880,441 A | 3/1999 | Hartman et al. |
| 5,887,510 A * | 3/1999 | Porter ............................ 99/287 |
| 5,914,045 A * | 6/1999 | Palmer et al. ................ 210/694 |
| 5,919,365 A | 7/1999 | Collette |
| 5,928,512 A * | 7/1999 | Hatch et al. .................. 210/266 |
| 5,932,098 A | 8/1999 | Ross |
| 5,939,122 A * | 8/1999 | Brady ........................... 426/474 |
| 5,942,143 A | 8/1999 | Hartman et al. |
| 5,943,946 A | 8/1999 | Chen |
| 6,004,460 A * | 12/1999 | Palmer et al. ................ 210/232 |
| 6,033,557 A * | 3/2000 | Gebhard et al. ............... 210/85 |
| 6,041,951 A * | 3/2000 | Blum et al. .................. 215/11.1 |
| 6,095,676 A * | 8/2000 | Kuan ............................ 366/256 |
| 6,117,319 A | 9/2000 | Cranshaw |
| 6,129,841 A * | 10/2000 | Dann ............................ 210/255 |
| 6,136,188 A * | 10/2000 | Rajan et al. .................. 210/244 |
| 6,136,189 A | 10/2000 | Smith et al. |
| 6,153,096 A * | 11/2000 | Nonren, Jr. ................... 210/238 |
| 6,165,362 A * | 12/2000 | Nohren et al. ............... 210/266 |
| 6,193,886 B1 * | 2/2001 | Nohren, Jr. ................... 210/282 |
| 6,200,015 B1 * | 3/2001 | Gartz et al. .................. 366/256 |
| 6,200,471 B1 * | 3/2001 | Nohren, Jr. ................... 210/184 |
| 6,231,226 B1 * | 5/2001 | Neidigh ....................... 366/256 |
| 6,231,909 B1 * | 5/2001 | Levinson ..................... 426/433 |
| 6,240,833 B1 * | 6/2001 | Sham et al. .................... 99/297 |
| 6,248,244 B1 * | 6/2001 | Dann ............................ 210/764 |
| 6,261,447 B1 * | 7/2001 | Van Herle et al. ........... 210/175 |
| 6,272,974 B1 | 8/2001 | Pascotti et al. |
| 6,277,284 B1 * | 8/2001 | Nohren ........................ 210/660 |
| 6,283,627 B1 * | 9/2001 | Fromm ........................ 366/260 |
| 6,303,023 B1 * | 10/2001 | Gebhard et al. ............... 210/85 |
| 6,324,966 B1 | 12/2001 | Joergensen |
| 6,324,967 B1 | 12/2001 | Robinson |
| 6,344,146 B1 * | 2/2002 | Moorehead et al. .......... 210/668 |
| 6,354,344 B1 * | 3/2002 | Pluta et al. ................... 141/192 |
| D456,205 S * | 4/2002 | Fromm ........................ D7/376 |
| 6,379,544 B1 | 4/2002 | Chen |
| 6,395,170 B1 * | 5/2002 | Hughes et al. ............... 210/232 |
| 6,402,949 B1 * | 6/2002 | Banks ....................... 210/257.1 |
| D460,319 S * | 7/2002 | Conran ........................ D7/397 |
| 6,422,133 B1 * | 7/2002 | Brady ............................ 99/297 |
| 6,468,435 B1 * | 10/2002 | Hughes et al. ............... 210/767 |
| 6,478,956 B2 * | 11/2002 | Kaura .......................... 210/232 |
| 6,523,711 B1 * | 2/2003 | Hughes et al. ............... 220/709 |
| 6,524,477 B1 * | 2/2003 | Hughes ........................ 210/282 |
| 6,561,234 B2 * | 5/2003 | Pluta et al. ..................... 141/95 |
| 6,565,743 B1 * | 5/2003 | Poirier et al. .................. 210/85 |
| 6,569,329 B1 | 5/2003 | Nohren |
| 6,634,869 B2 * | 10/2003 | Britz ............................ 417/313 |
| 6,641,719 B1 * | 11/2003 | Naito ........................... 210/136 |
| 6,656,350 B2 | 12/2003 | Kitakaze |
| 6,689,279 B1 * | 2/2004 | Train ............................ 210/800 |
| 6,733,669 B1 * | 5/2004 | Crick ........................... 210/244 |
| 6,797,160 B2 * | 9/2004 | Huang .......................... 210/117 |
| 6,797,304 B2 * | 9/2004 | McGonagle .................. 426/431 |
| 6,915,733 B1 | 7/2005 | Langbauer |
| 6,919,022 B2 * | 7/2005 | Cluff et al. ................... 210/205 |
| 6,919,025 B2 | 7/2005 | Cluff et al. |
| 7,014,759 B2 * | 3/2006 | Radford ....................... 210/232 |
| 7,040,218 B1 * | 5/2006 | Biolchini, Jr. ................. 99/297 |
| 7,077,273 B2 * | 7/2006 | Ellsworth et al. ............ 210/514 |
| 7,077,951 B2 * | 7/2006 | Monteiro ..................... 210/136 |
| 7,090,779 B2 * | 8/2006 | Bernstein et al. ........ 210/748.11 |
| 7,093,531 B2 * | 8/2006 | Tardif ............................ 99/297 |
| 7,194,951 B1 * | 3/2007 | Porter .......................... 100/116 |
| 7,213,507 B2 * | 5/2007 | Glucksman et al. ........... 99/297 |
| D557,978 S * | 12/2007 | Bodum ......................... D7/399 |
| 7,306,723 B2 * | 12/2007 | Radford ....................... 210/232 |
| D559,034 S * | 1/2008 | Bodum ......................... D7/376 |
| 7,323,104 B2 * | 1/2008 | Wennerstrom ............... 210/266 |
| 7,337,705 B1 * | 3/2008 | Catena et al. .................. 99/297 |
| D570,647 S * | 6/2008 | Bodum ......................... D7/510 |
| D571,610 S * | 6/2008 | Bodum ......................... D7/399 |
| 7,384,545 B2 * | 6/2008 | Patton et al. ............... 210/198.1 |
| 7,389,720 B2 * | 6/2008 | Haverstock .................... 99/297 |
| D573,396 S * | 7/2008 | Gauss .......................... D7/319 |
| 7,413,653 B2 | 8/2008 | Powell |
| 7,416,087 B2 * | 8/2008 | Press ............................ 210/466 |
| 7,416,327 B2 * | 8/2008 | Ghidini ........................ 366/242 |
| 7,427,355 B2 * | 9/2008 | Chau ............................ 210/266 |
| 7,438,799 B2 * | 10/2008 | Vandenbelt et al. ............ 210/85 |
| 7,438,801 B2 * | 10/2008 | Scaringe ...................... 210/137 |
| 7,449,106 B2 | 11/2008 | Ramsey et al. |
| 7,507,338 B2 * | 3/2009 | Bommi et al. ............... 210/232 |
| 7,544,294 B2 * | 6/2009 | Halterman .................... 210/232 |
| 7,547,272 B2 * | 6/2009 | Ellsworth et al. .............. 494/37 |
| 7,585,409 B2 * | 9/2009 | Bommi et al. ............... 210/120 |
| 7,604,737 B2 * | 10/2009 | Francisco et al. ............ 210/232 |
| 7,607,592 B1 * | 10/2009 | Kim .............................. 239/377 |
| D608,142 S * | 1/2010 | Davies et al. ................ D7/399 |
| D612,660 S * | 3/2010 | Bodum ......................... D7/319 |
| 7,766,057 B2 * | 8/2010 | Windmiller .................. 141/113 |
| 7,767,087 B2 * | 8/2010 | Wilson ......................... 210/249 |
| 7,790,117 B2 * | 9/2010 | Ellis et al. .................... 422/400 |
| 7,810,651 B2 * | 10/2010 | Miga, Jr. ...................... 210/466 |
| 7,824,546 B2 * | 11/2010 | Jones et al. .................. 210/136 |
| 7,837,865 B2 * | 11/2010 | Wadstrom .................... 210/85 |
| D628,846 S * | 12/2010 | Bodum ......................... D7/319 |
| 7,849,784 B2 * | 12/2010 | Adler ............................. 99/297 |
| 7,854,848 B2 * | 12/2010 | Olson et al. .................. 210/691 |
| 7,862,720 B2 * | 1/2011 | Brown .......................... 210/335 |
| 7,955,501 B2 * | 6/2011 | Wilson ......................... 210/120 |
| 7,993,518 B2 * | 8/2011 | Shani ........................... 210/236 |
| 8,007,948 B2 * | 8/2011 | Hobmeyr et al. ............. 429/433 |
| 8,043,502 B2 * | 10/2011 | Nauta ........................... 210/232 |
| 8,051,766 B1 * | 11/2011 | Yu et al. ........................ 99/297 |
| 8,051,997 B2 * | 11/2011 | Buckley ....................... 215/230 |
| 8,097,159 B1 * | 1/2012 | Peng ............................ 210/244 |
| 8,105,486 B1 * | 1/2012 | Kuo .............................. 210/232 |
| 8,128,820 B2 * | 3/2012 | Wu ............................... 210/251 |
| 8,137,552 B2 * | 3/2012 | Kisterev et al. .............. 210/282 |
| 8,142,652 B2 * | 3/2012 | Wadstrom .................... 210/175 |
| 8,142,654 B2 * | 3/2012 | Kohl ............................ 210/244 |
| 8,147,685 B2 * | 4/2012 | Pritchard ....................... 210/94 |
| 8,152,361 B2 * | 4/2012 | Swartz et al. ................ 366/243 |
| 8,177,966 B2 * | 5/2012 | Wu ................................ 210/88 |
| 8,177,968 B2 * | 5/2012 | Wang ........................... 210/136 |
| 8,182,683 B1 * | 5/2012 | Allen ........................... 210/244 |
| 8,205,541 B2 * | 6/2012 | Barberio et al. ............ 99/277.1 |
| 8,206,648 B2 * | 6/2012 | Sattler ............................ 422/50 |
| RE43,547 E * | 7/2012 | Ellsworth et al. .............. 494/37 |
| 8,216,462 B2 * | 7/2012 | O'Brien et al. .............. 210/200 |

| | | | |
|---|---|---|---|
| 8,216,465 B2* | 7/2012 | Nauta | 210/232 |
| 8,231,794 B2* | 7/2012 | Gilmour | 210/791 |
| 2002/0008062 A1* | 1/2002 | Torigoe | 210/416.3 |
| 2002/0036176 A1* | 3/2002 | Hughes et al. | 210/767 |
| 2002/0070154 A1 | 6/2002 | Kitakaze | |
| 2002/0110464 A1* | 8/2002 | Britz | 417/401 |
| 2002/0117442 A1* | 8/2002 | Kaura | 210/474 |
| 2003/0047081 A1* | 3/2003 | McGonagle | 99/279 |
| 2003/0164333 A1* | 9/2003 | Nohren et al. | 210/650 |
| 2004/0134932 A1 | 7/2004 | Lobdell | |
| 2004/0144701 A1* | 7/2004 | Cluff et al. | 210/101 |
| 2004/0144711 A1* | 7/2004 | Cluff et al. | 210/244 |
| 2004/0154471 A1* | 8/2004 | Tardif | 99/279 |
| 2005/0035041 A1* | 2/2005 | Nohren et al. | 210/209 |
| 2005/0051476 A1* | 3/2005 | Chen et al. | 210/436 |
| 2005/0109689 A1* | 5/2005 | Trachtenbroit | 210/238 |
| 2005/0139091 A1* | 6/2005 | Haverstock | 99/495 |
| 2005/0252844 A1* | 11/2005 | Chau | 210/282 |
| 2005/0279768 A1 | 12/2005 | Chatrath | |
| 2006/0118481 A1* | 6/2006 | Trachtenbroit | 210/470 |
| 2006/0151381 A1 | 7/2006 | Wennerstrom | |
| 2006/0191826 A1* | 8/2006 | Chajec | 210/86 |
| 2007/0045169 A1* | 3/2007 | Powell | 210/416.3 |
| 2007/0090044 A1* | 4/2007 | Mihashi et al. | 210/473 |
| 2007/0095740 A1 | 5/2007 | Ramsey et al. | |
| 2007/0108136 A1* | 5/2007 | Gold | 210/767 |
| 2007/0158251 A1* | 7/2007 | Chau | 210/223 |
| 2007/0221556 A1* | 9/2007 | Chung | 210/198.1 |
| 2007/0262010 A1* | 11/2007 | Wadstrom | 210/175 |
| 2008/0035553 A1* | 2/2008 | Brown | 210/335 |
| 2008/0057505 A1* | 3/2008 | Lin et al. | 435/6 |
| 2008/0067120 A1 | 3/2008 | Chatrath | |
| 2008/0087596 A1* | 4/2008 | Bommi et al. | 210/232 |
| 2008/0203005 A1* | 8/2008 | Francisco et al. | 210/238 |
| 2008/0206757 A1* | 8/2008 | Lin et al. | 435/6 |
| 2008/0251434 A1* | 10/2008 | Marra | 210/119 |
| 2008/0302711 A1* | 12/2008 | Windmiller | 210/137 |
| 2009/0008343 A1* | 1/2009 | Gilmour | 210/791 |
| 2009/0050559 A1* | 2/2009 | Rosenberg-Nevo | 210/514 |
| 2009/0127178 A1* | 5/2009 | Kuo | 210/232 |
| 2009/0145839 A1 | 6/2009 | Miga, Jr. | |
| 2009/0155436 A1* | 6/2009 | Chalmers et al. | 426/398 |
| 2009/0202691 A1* | 8/2009 | Gauger | 426/432 |
| 2009/0238725 A1* | 9/2009 | Ellis et al. | 422/101 |
| 2009/0294347 A1* | 12/2009 | Wochele et al. | 210/244 |
| 2009/0294385 A1* | 12/2009 | Tajima et al. | 210/808 |
| 2010/0032386 A1* | 2/2010 | Lehovec | 210/774 |
| 2010/0065503 A1* | 3/2010 | Olson et al. | 210/694 |
| 2010/0102002 A1* | 4/2010 | O'Brien et al. | 210/668 |
| 2010/0170839 A1* | 7/2010 | Kohl | 210/232 |
| 2010/0187183 A1* | 7/2010 | Nelson et al. | 210/741 |
| 2010/0219151 A1* | 9/2010 | Risheq | 215/44 |
| 2010/0237017 A1* | 9/2010 | Maiden | 210/660 |
| 2010/0243582 A1* | 9/2010 | Riedel et al. | 210/767 |
| 2010/0243583 A1* | 9/2010 | Riedel et al. | 210/767 |
| 2010/0314306 A1* | 12/2010 | Wadstrom | 210/175 |
| 2011/0000848 A1* | 1/2011 | Alkemade et al. | 210/514 |
| 2011/0062153 A1* | 3/2011 | Wang | 220/23.86 |
| 2011/0114546 A1* | 5/2011 | Barsky et al. | 210/143 |
| 2011/0114574 A1* | 5/2011 | Sturgess | 210/808 |
| 2011/0117257 A1* | 5/2011 | Sturgess | 426/398 |
| 2011/0124106 A1* | 5/2011 | Froman et al. | 435/379 |
| 2011/0159533 A1* | 6/2011 | Karkouche | 435/29 |
| 2011/0168644 A1* | 7/2011 | Harris et al. | 210/767 |
| 2011/0233118 A1* | 9/2011 | Nelson | 210/117 |
| 2011/0233119 A1* | 9/2011 | Nelson | 210/117 |
| 2011/0278206 A1* | 11/2011 | Hull et al. | 210/85 |
| 2011/0278216 A1* | 11/2011 | Hull et al. | 210/236 |
| 2012/0017766 A1* | 1/2012 | Anson et al. | 99/290 |
| 2012/0024769 A1* | 2/2012 | Martin et al. | 210/198.1 |
| 2012/0037563 A1* | 2/2012 | Liao | 210/634 |
| 2012/0055862 A1* | 3/2012 | Parekh et al. | 210/244 |
| 2012/0152380 A1* | 6/2012 | Risheq | 137/544 |
| 2012/0152844 A1* | 6/2012 | Pritchard | 210/650 |
| 2012/0187036 A1* | 7/2012 | Risheq | 210/282 |

FOREIGN PATENT DOCUMENTS

| | | |
|---|---|---|
| EP | 0615714 | 9/1994 |
| GB | 2329852 A | 4/1999 |
| GB | 2340027 | 2/2000 |
| JP | 2002-126725 A | 5/2002 |
| KR | 20-2009-0011222 U | 11/2009 |
| WO | WO 99/25156 | 5/1999 |
| WO | WO 00/09240 | 2/2000 |
| WO | WO 00/57985 | 10/2000 |
| WO | WO 00/68151 | 11/2000 |
| WO | WO 2006/021966 | 3/2006 |
| WO | WO 2007/144715 | 12/2007 |
| WO | WO 2010/025521 | 3/2010 |

* cited by examiner

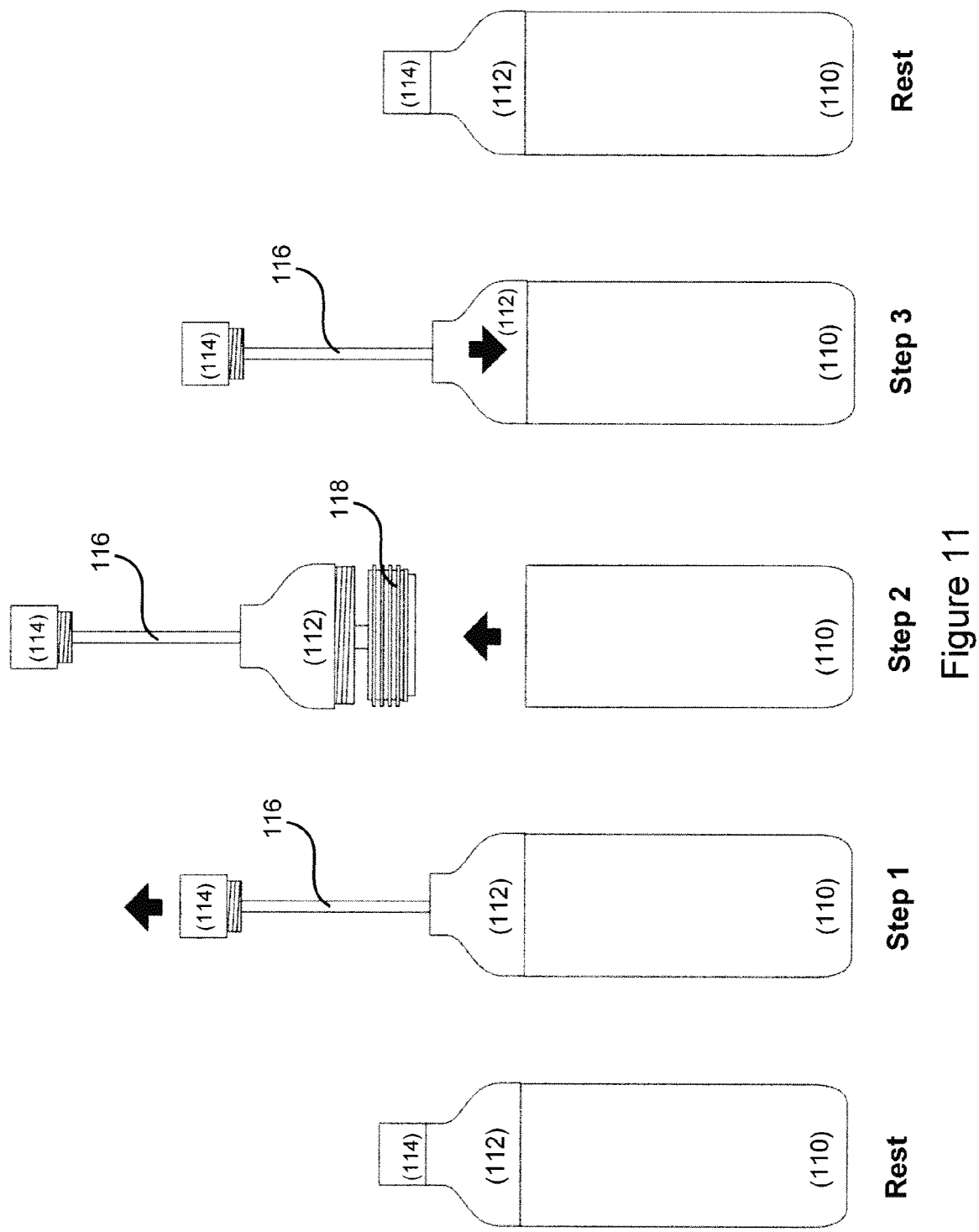

BOTTLE WITH AN INTEGRATED FILTRATION ASSEMBLY THAT IS MANUALLY OPERATED USING A PLUNGER

BACKGROUND OF THE INVENTION

1. Field of the Invention

The present invention relates generally to water filtrations systems and more particularly to personal water filtration systems integrated with a portable vessel.

2. Description of Related Art

Bottled water is preferred by many consumers for reasons that include convenience, prestige and perceived quality of bottled water. In practice, there exist a number of health, sustainability and environmental issues associated with single-use bottles. The quality of bottled water can be affected by storage conditions. Up to 33% of bottled water may be contaminated resulting from both contamination of sources and bottling facilities as well as the use of plastic bottles. For example, commonly used plastics can leach hydrocarbon-based contaminants into water, particularly when the plastic bottles are stored in direct sunlight or at elevated temperatures. Furthermore, it is estimated that 87% of plastic water bottles are dispatched to a land fill rather than a recycling facility. Transportation costs and effects on the environment are also increased because bottled water is often shipped from distant locations, including Fiji and France. Consequently single-use plastic bottles are associated with increased disposal and recycling costs and sustainability issues.

Current alternatives to bottled water employ reusable bottles, generally designed for sporting and/or camping purposes and are not optimized for city life. Reusable bottles rely on home or office filtration systems as a refilling source. Other available water supplies vary in quality. For example, public water supplies may have chlorine and other undesirable tastes, often from metallic conduits. Water supplies may also be affected by the source, including hard water obtained from an aquifer or river flowing through limestone. Water sources purified by reverse osmosis systems may be flat and unattractive to the taste of some consumers. Water derived from wells or poorly maintained storage tanks may also harbor contaminants.

Accordingly, there is a need for a consumer-oriented, easy-to-use, portable filtration system that is both functional and stylish.

BRIEF SUMMARY OF THE INVENTION

Aspects of the present invention address the various problems with bottled water and reusable portable containers, including those outlined above. Certain embodiments of the invention provide a container for fluids that has an integrated filtration system. The container typically has a substantially cylindrical vessel with an inner surface, an outer surface and an opening, usually at an upper end of the vessel. A pressing assembly includes a stopper that is attached to, or is part of a pressing assembly, which also includes a filtration assembly. The pressing assembly further includes a rod having a top end that is attached to the stopper and a bottom end that is releasably attached to the filtration assembly. A vessel top is configured to receive the pressing assembly such that the rod of the pressing assembly is slidably attached to a bearing of the vessel top. A chamber of the filtration assembly receives a filtration element and has a gasket attached that maintains a seal between the inner surface of the vessel and an outer perimeter of the filtration assembly. The orientation of the rod is controlled by the gasket and by the bearing. In use, pressure applied to the pressing assembly drives the filtration assembly through the vessel, typically from top to bottom, and cause unfiltered water to pass through the filter element in order to remove dissolved chemicals, microbes and particulate materials in the unfiltered water. Filtered water is obtained in the upper portion of the vessel.

In some embodiments, the filtration element comprises activated carbon. The filtration assembly may receive one or more pods that add a substance to water filtered by the filtration element when the pressing assembly is forced through the vessel. The additive may be fruit essence and/or a nutrient to the water filtered by the filtration element. The nutrient comprises a mineral. Water filtered by the filtration element when the pressing assembly is forced through the vessel meets NSF/ANSI Standard 42 and/or NSF/ANSI Standard 53.

In some embodiments, the stopper includes a valve operated by a ring, whereby the ring rotates about an axis of the bottle between a first and second position such that the valve is closed when the ring is in the first position and open when the ring is in the second position. The ring may also be used to operate the pressing assembly when oriented in the first position.

In some embodiments, the gasket comprises an element having a plurality of fins, such as a U-ring or a V-ring. The gasket may also comprise a chevron packing seal and/or an O-ring. In some of these embodiments, the gasket is selected to withstand a hydrostatic force of at least 5 pounds per square inch. In some of these embodiments, the gasket is selected to withstand a hydrostatic force of at least 25 pounds per square inch or greater. It will be appreciated that some gaskets could be used that withstand lesser hydrostatic pressures. The container may be a bottle or a pitcher or be provided in some other suitable form.

BRIEF DESCRIPTION OF THE DRAWINGS

FIG. 11 illustrates a procedure for filtering water using a vessel according to certain aspects of the invention.

DETAILED DESCRIPTION OF THE INVENTION

Figure 1:
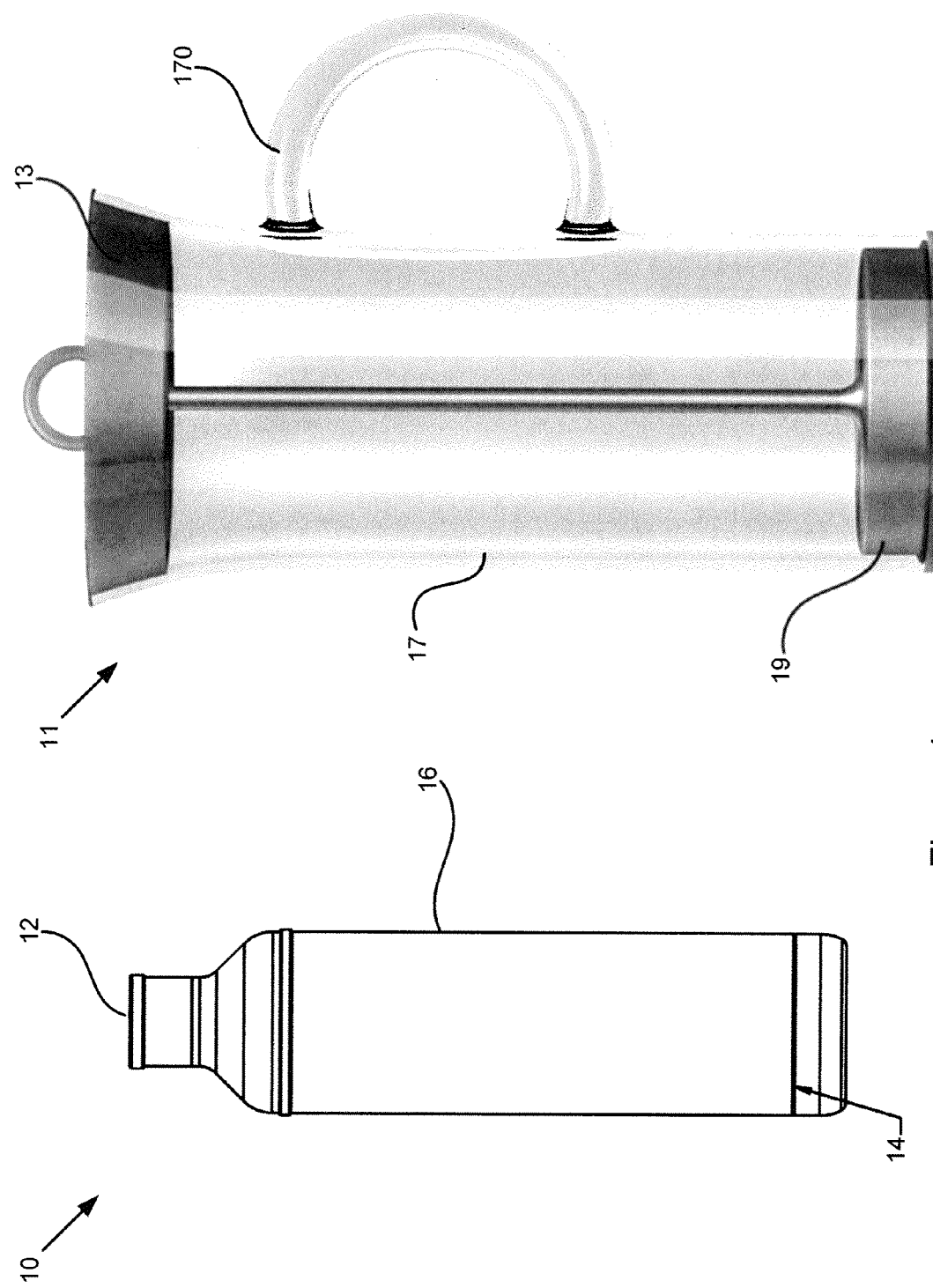
FIG. 1 shows two examples of vessels according to certain aspects of the invention.

Embodiments of the present invention will now be described in detail with reference to the drawings, which are provided as illustrative examples so as to enable those skilled in the art to practice the invention. Notably, the figures and examples below are not meant to limit the scope of the present invention to a single embodiment, but other embodiments are possible by way of interchange of some or all of the described or illustrated elements. Wherever convenient, the same reference numbers will be used throughout the drawings to refer to same or like parts. Where certain elements of these embodiments can be partially or fully implemented using known components, only those portions of such known components that are necessary for an understanding of the present invention will be described, and detailed descriptions of other portions of such known components will be omitted so as not to obscure the invention. In the present specification, an embodiment showing a singular component should not be considered limiting; rather, the invention is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the components referred to herein by way of illustration.

Certain embodiments of the invention provide a standalone, manually-operated filtering system that can be used to purify water. In particular, the filtration system provides a method for passing drinking water through one or more filter elements that can remove contaminants that may include particulates, microbes and chemicals, whether dissolved or in suspension. The filtration system may additionally receive an element that infuses the water with flavoring, nutrients and other such additives. The degree of filtering can be selected by choosing from a range of filters. For example, filtration to NSF-42 and NSF-53 levels can be attained by selection of filters and seals. NSF International is a not-for-profit, non-governmental organization and is the world leader in standards development, product certification, education, and risk-management for public health and safety. NSF is accredited by the American National Standards Institute ("ANSI") to develop American national standards for drinking water treatment units has developed key standards for evaluation and certification of drinking water treatment units.

NSF/ANSI Standard 42 applies to drinking water treatment units address aesthetic effects, covering point-of-use (POU) and point-of-entry (POE) systems designed to reduce specific aesthetic or non-health-related contaminants (chlorine, taste and odor, and particulates) that may be present in public or private drinking water. NSF/ANSI standard 53 applies to drinking water treatment units and addresses health effects covering point-of-use (POU) and point-of-entry (POE) systems designed to reduce specific health-related contaminants, such as Cryptosporidium, Giardia, lead, volatile organic chemicals (VOCs) and methyl tertiary-butyl ether (MTBE) that may be present in public or private drinking water. Examples of filter elements will be discussed below, but many embodiments employ at least one filter element that uses activated carbon to remove chemicals from water.

Certain embodiments of the invention comprise a container that has an integral filtration system. The container may take any shape or form appropriate for an intended use. FIG. 1 shows two examples of forms according to certain aspects of the invention. A bottle 10 can be shaped and sized based on a targeted application. For example, a bottle may have an outer diameter 14 of a lower cylindrical portion that is selected to fit a cup holder of an automobile or other vehicle. In another example, bottle 10 may have a substantially cylindrical body 16 sized to fit in a bottle holder of a bicycle, sling, belt and/or backpack, etc. Bottle 10 is shown to have an opening 12 to facilitate pouring or to allow a user to drink directly the contents of bottle 10. A pitcher, carafe or other vessel 11 may be shaped and sized to provide a desired quantity of water in a container that can be provided in a kitchen or dining room setting and can be easily carried to other locations in a residence, restaurant, hotel, sporting facility, and so on. Pitcher 11 is depicted as having a generally transparent body 17, a handle 170 and lid 13, with a filter element a9 that rests at the bottom of the container 11.

Figure 2:
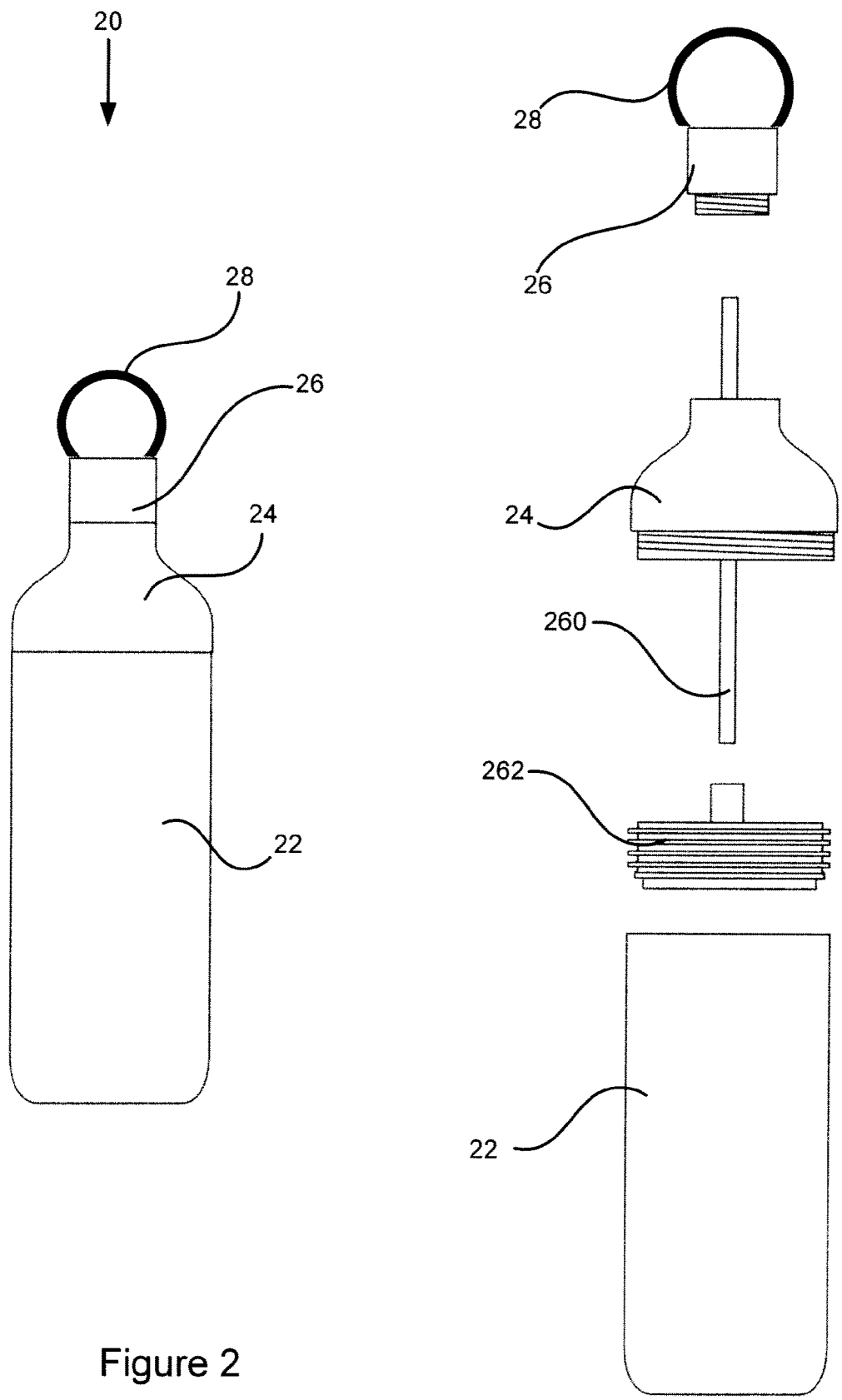
FIG. 2 depicts one example of a bottle in assembled and partially disassembled forms.

Turning to FIG. 2, an example of a bottle 20 is shown in assembled form 20 and partially disassembled form. In this example, bottle 20 can be formed with a metallic vessel body 22, top (or neck) 24 and stopper assembly 26. Any suitable metal and/or metal alloy may be used including, for example, steel (particularly, stainless steel), aluminum, copper, gold, silver, etc. Other materials can be used including, for example, glass, Polyoxymethylene ("POM"), HDPE, ABS, PET, PS, PP and copolyster. Materials can be used in combination, including for example, a combination of steel with POM reinforcement. In another example, a vessel body 22 constructed from glass can be combined with stainless steel top 24. Multiple layers may be formed using metals, alloys, platings, anodizations, coatings and so on. In one example, a copper element may have a nickel plated exterior and an interior surface coated with an impervious, inert plastic material. In another example, ceramics may be employed to obtain thermal insulation and finished surfaces may comprise metal layers, sintered layers and/or glazed surfaces. It will also be appreciated that thermal insulation may be obtained buy separating two or more layers separated by an insulator, including an insulating layer of air.

Certain general aspects of the filtration system can be observed in the partially disassembled depiction of bottle 20. A pressing assembly 260, 262 is fixed to stopper assembly 26 and slidably attached to neck 24 of bottle 20 such that, when neck 24 is secured to body 22 (see (bottle 20), a tray, container or other filtration element (hereinafter, referred to interchangeably as "filter") 262 can be raised or lowered within body 22 by respectively pulling stopper assembly 26 away from neck 24 or by pushing stopper assembly 26 towards neck 24. The movement of stopper assembly 26 may be facilitated using pull-ring 28. Filter 262 is attached to stopper assembly 26 by a stem or rod 260 that typically has a length that allows the filter 262 to travel the full length of body 22. Filter 262 may be provided with a contoured form that snugly fits the interior bottom of body 22, thereby providing an effective lock against lateral motion of the filter 262 when the bottle is in use. As will be discussed later, neck 24 typically includes a gasket and/or bearing that maintains a tight fit with the stem 260. Stopper assembly 26 can typically be locked to prevent unintended withdrawal of the stem 260 (and consequent ascension of filter 262) when in use.

Figure 3:
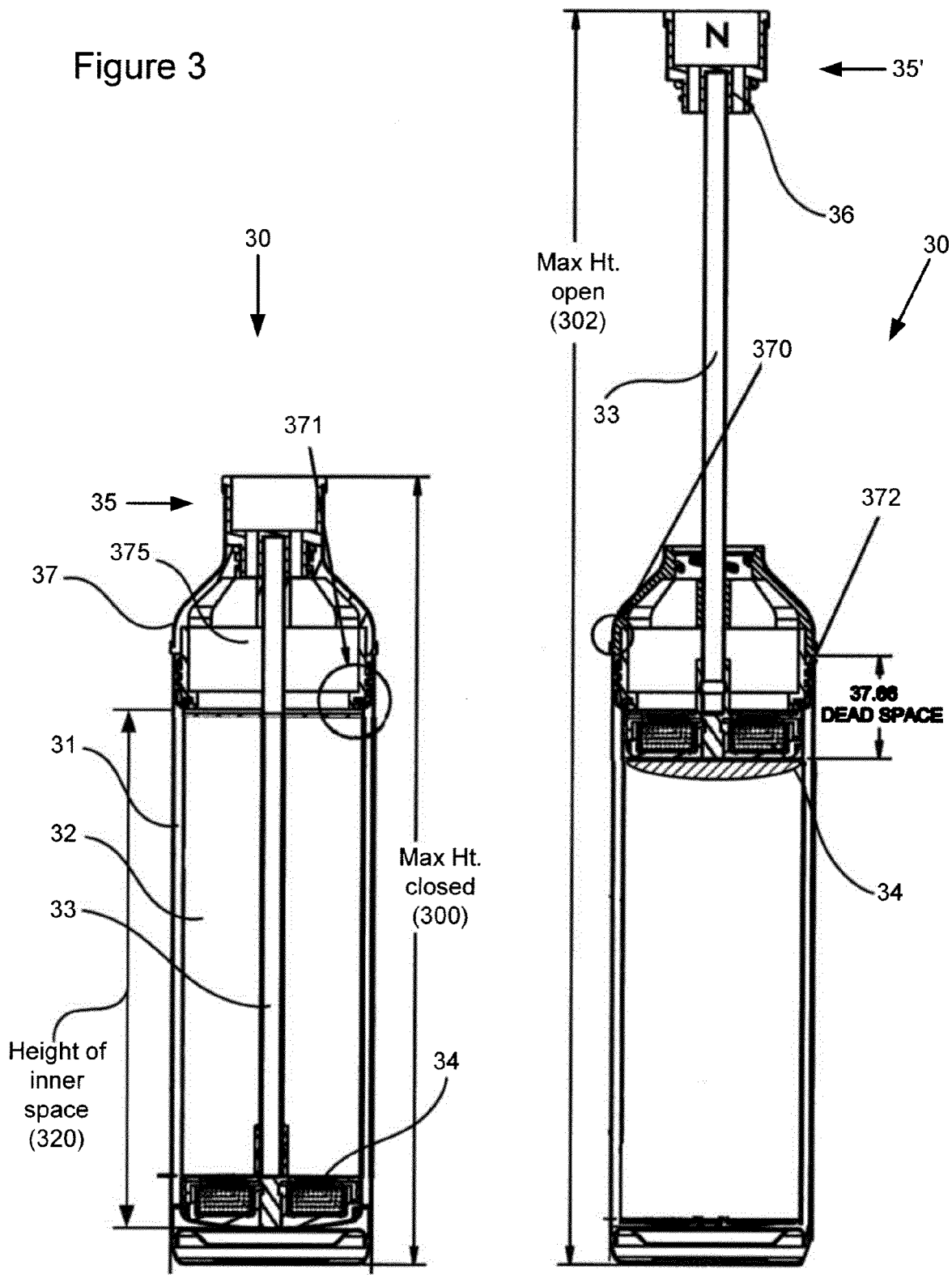
FIG. 3 provides cross-sectional views of an example of a vessel constructed according to certain aspects of the invention.

FIG. 3 depicts, in cross-section, another example of a bottle 30 provided according to certain aspects of the invention. In FIG. 3, bottle 30 is shown with stopper assembly 35 in its normal, rest position, where it is releasably attached to neck assembly 37 and defines the height (300) of bottle 30 when closed. FIG. 3 also shows bottle 30 with stopper assembly 35' extended upwards away from neck assembly 37 to a maximum height 302 from the bottom of the body 31. Contents are typically liquid and are maintained in an inner space 32. The maximum volume of contents that can be held by inner space 32 is reduced in this embodiment by the volume of filtration element 34, which is configured to traverse the axial length of bottle 30.

In the example of FIG. 3, assembly of bottle 30 is facilitated by one or more screw threads used to fasten body 31 and neck 37 together. Stopper assembly 35, including stem 33 and filter 34 are secured by a gasket and/or bearing 375. Filter 34 prevents stem 33 from being withdrawn completely through neck assembly 37. Stem 33 may be fastened to stopper assembly by any suitable means, including by screw fastening (as shown at 36), by welding, glue, bonding and/or by separate mechanical fastener. It is contemplated that, in at least some embodiments, the stem may be fabricated as an integral part of the stopper assembly—or some portion thereof—by molding, extrusion, machining or any other available means. Likewise, filtration element 34 may be similarly attached to the lower end of stem 33. However it will be noted here, and described in more detail below, that the connection of filtration element 34 to stem 33 typically requires an impermeable bond that resists fluid under significant pressure.

Figure 4:
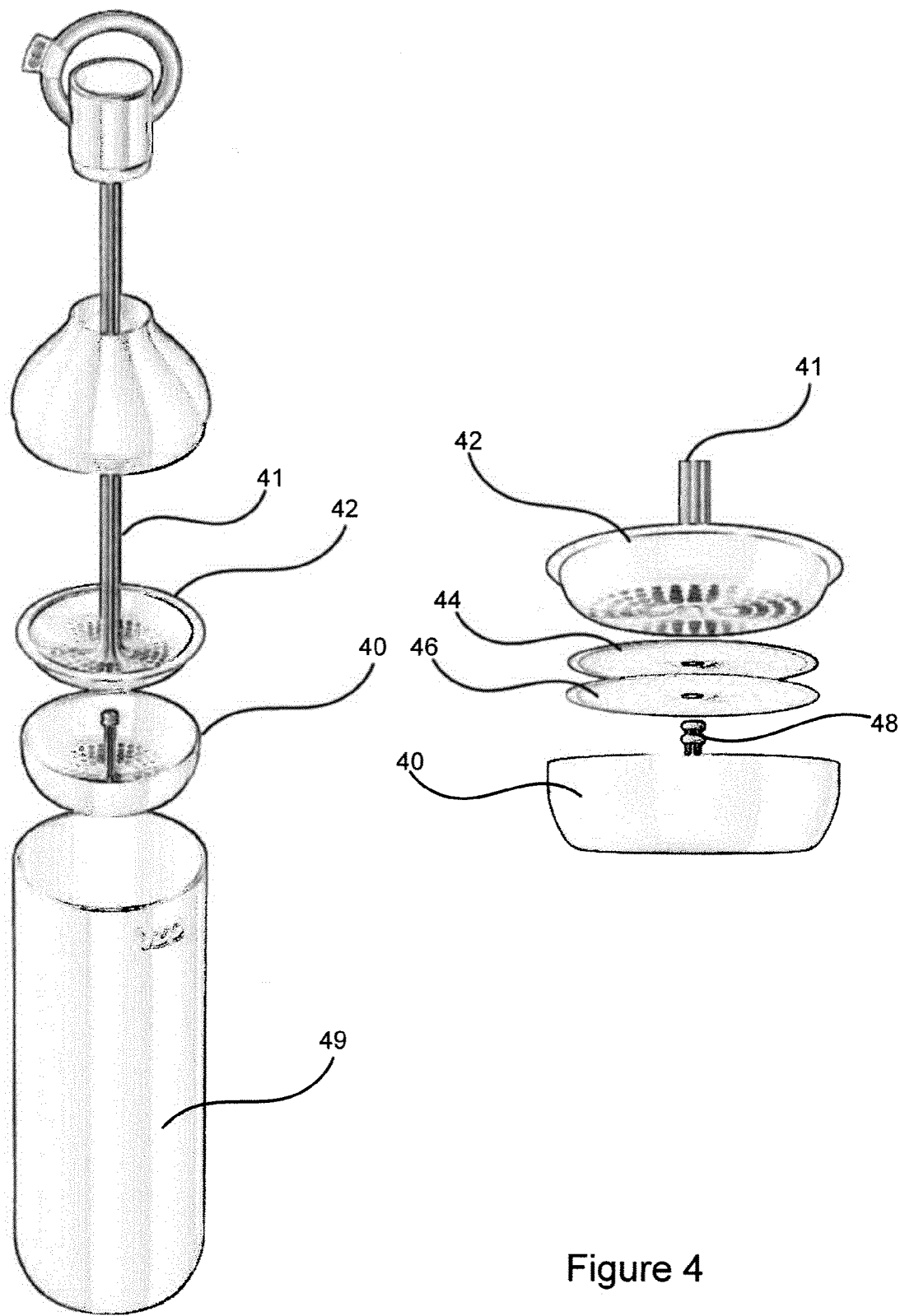
FIG. 4 shows an example of a simplified filtration assembly.

FIG. 4 shows a simplified filtration assembly according to certain aspects of the invention. As depicted, the filtration assembly comprises basket 40 and cover 42 elements that create an enclosure when fastened to stem 41. The enclosure receives filter elements 44 and 46 and, optionally, treatment elements (not shown). Sealing elements 48 provide an internal seal within the enclosure created by basket 40 and cover 42. It will be appreciated that the basket is typically constructed to closely fit within the body of bottle 49 in order to facilitate creation of a seal that directs fluid through filter elements 44 and 46.

Figure 5A:
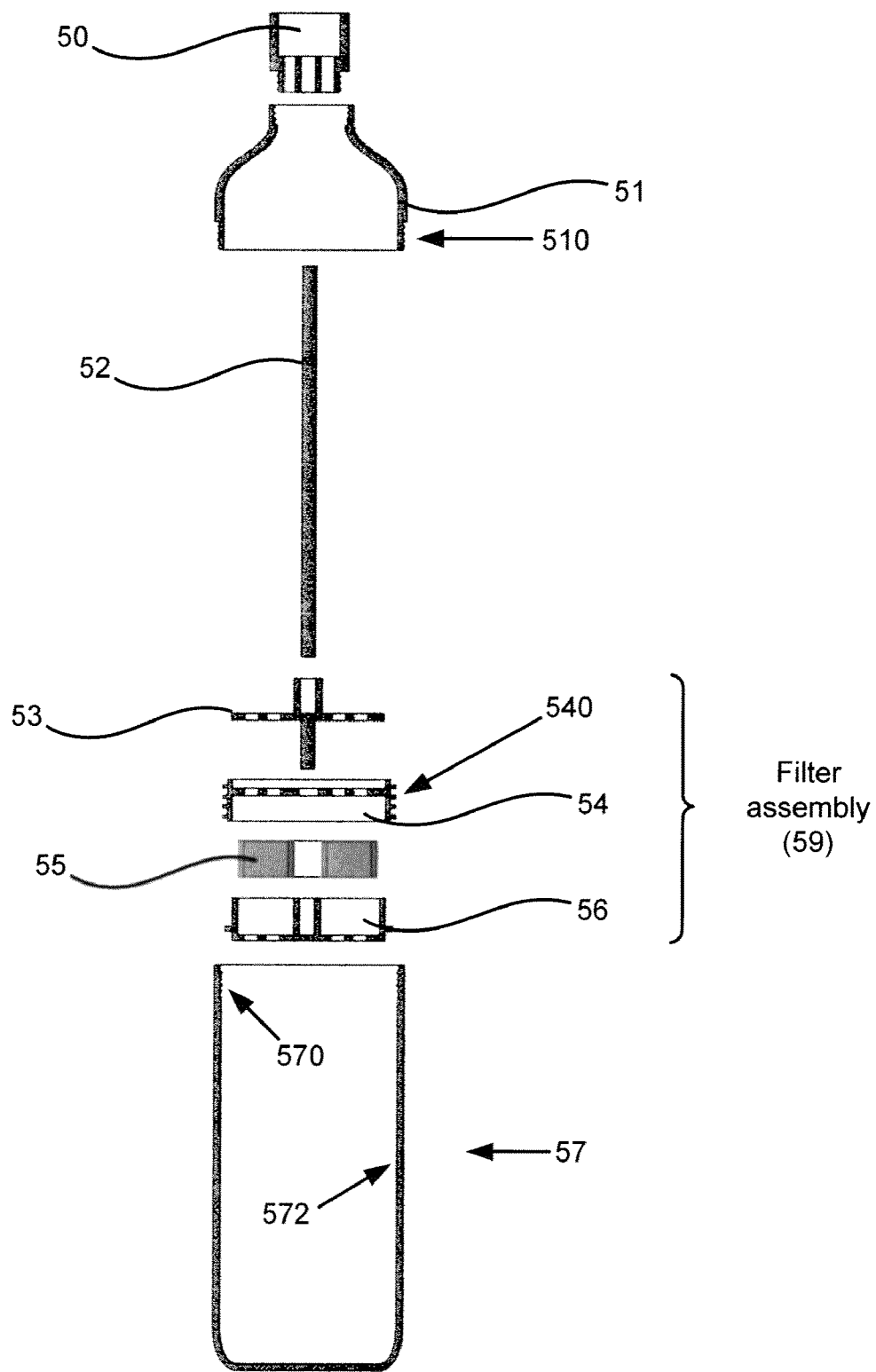
FIG. 5A is a cross-sectional view of a bottle constructed according to certain aspects of the invention.
Figure 5B:
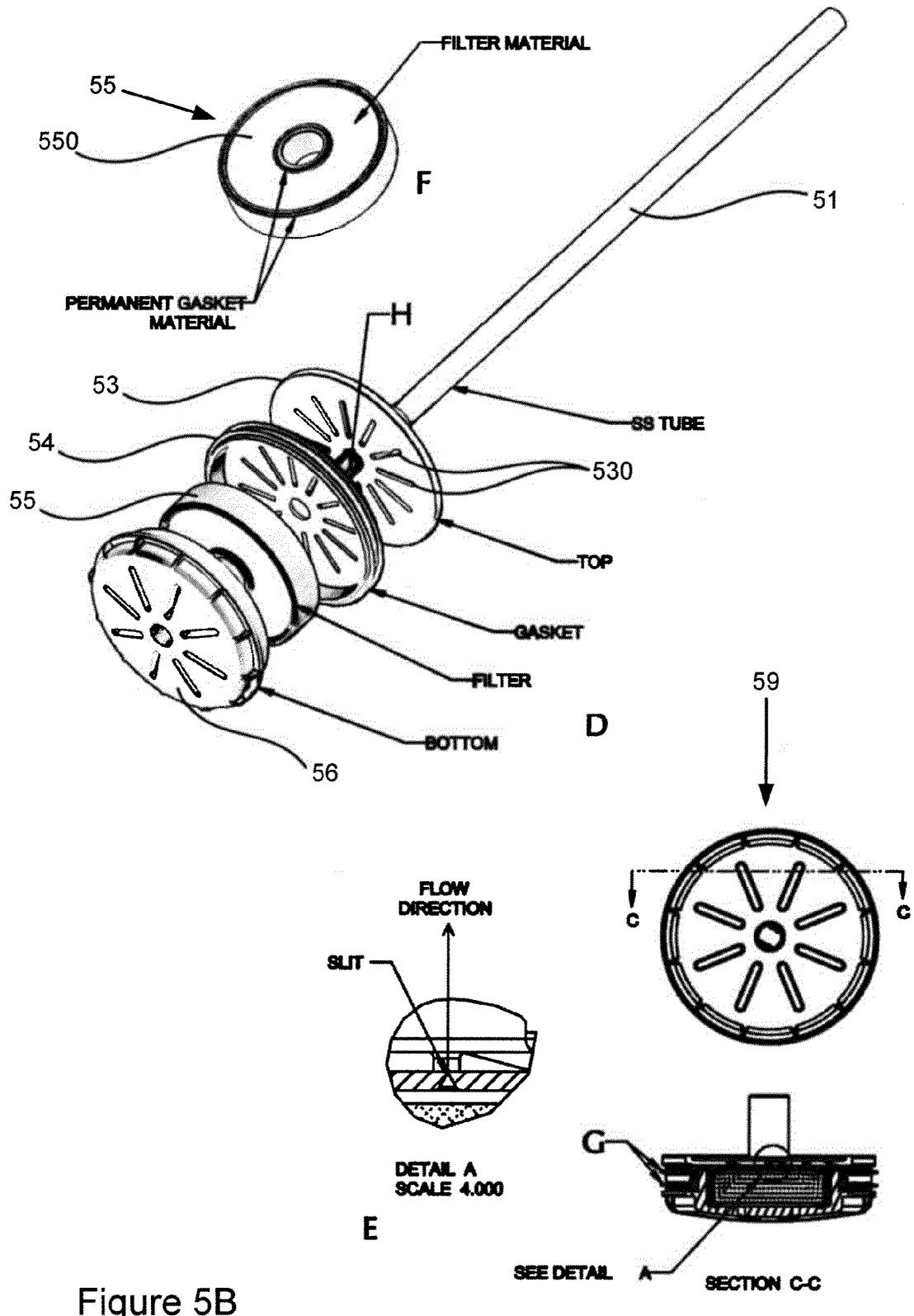
FIG. 5B is an exploded view of a filtration element used in certain embodiments of the invention.

FIGS. 5A and 5B provide views of vessels a filter assembly 59 according to certain aspects of the invention. FIG. 5A shows a bottle that comprises a main vessel 57, a vessel top 51, a lid or stopper 50, a plunger rod or stem 52 and a filter assembly that, when assembled forms a cage having a cage top 53, a cage bottom 56, a gasket element 54 and a filter pod or insert 55. Gasket element has a plurality of fins 540 around its circumference that creates a seal when assembled cage 59 is inserted into vessel 57. Main vessel 57 and vessel top 51 are typically provided with threads that enable vessel top 51 and main vessel 57 to be fastened together.

FIG. 5B shows assembled filter assembly 59 and provides additional detail of filter assembly 59 components. Filter assembly 59 comprises a top element 53 and a bottom element 56 that create an enclosure, basket or cage that holds one or more filter elements 55 (also referred to as filter pods 55). The filter element 59 is typically constructed to tightly fit within the main vessel 57. A seal may be obtained using separate gasket element 54 (e.g., as depicted in FIG. 5A) and/or may be obtained and/or augmented using gaskets provided as part of top element 53 and/or bottom element 56. Gasket element 54 is used to create a seal between filter assembly 59 and the inside surface 572 of bottle 57 (see FIG. 5A). In one example, bottom element 56 can be fabricated with a circumferential groove or notch to receive an annular sealant as an alternative to, or in addition to, separate gasket element 54.

The seal between filter assembly 59 and the inside surface 572 of bottle 57 prevents leakage of unfiltered water into the filtered (upper) portion of water stored within main vessel 57. Effectiveness of the seal can be maximized by fabrication of the filter assembly 59 to tight manufacturing tolerances. Any remaining gaps are sealed by one or more of the described gasket elements 54. The seal must typically withstand pressures of between 5 and 25 pounds per square inch. Consequently, many embodiments are constructed to minimize the area covered by a seal, thereby reducing stresses on the gasket materials. The level of hydrostatic pressure within the main vessel 57 during filtration is determined by the structure and quantity of filtration elements, as well as the dimensions of the vessel 57 and filtration assembly 59.

Gasket element 54 may include a groove or slot to receive an annular seal that can be one or more of an O ring, a U seal, a V seal, a washer, a cup seal and a chevron packing seal. This list is not intended to be exhaustive and the type of seal used may be based on a number of factors including availability, performance under pressure, friction, material strength and inertness of components. Seals are often constructed from rubber, silicone rubber, PTFE, fabric reinforced nitrile, polyethylene and other polymers. However, it is contemplated that seals may be constructed from other materials as dictated by requirements of the application.

Filter element 55 may be provided as a solid, hard or soft container into which a filtering material is packed. As depicted in FIG. 5B, filter element 55 comprises an annular component that tightly fits within the enclosure formed by top element 53 and bottom element 56. In one example, the filter element comprises packed activated carbon capable of removing impurities and dissolved chemicals from water passing through filter element 55. The depicted "hockey puck" filter element 55 may be encased or surrounded by a material that provides additional filtering of particulate matter and prevents the escape of carbon dust into the filtered water. A cover of polypropylene, cellulose, natural fiber, treated paper or other suitable material can be used as necessary or desired and the cover may be conforming (e.g. a coating) or have a loose "tea-bag" like form.

The fit of the filter element 55 within the filter assembly 59 may be improved by providing additional seals between filter element 55 and bottom element 56, top element 53 and/or gasket element 54. It will be appreciated that the gasket 54 and other seals, where used, are provided to force fluid flowing from beneath the bottom element 56 to beyond the top element 53 through the filter element 55 without leakage. Typically, the fluid flows under a hydrostatic pressure ranging between 5 psi and 10 psi, but it is contemplated that pressures up to 25 psi may be handled by the filtration system.

Fit of components, structure of seals and gasket element construction typically takes into consideration the pressure expected from use of the device. For example, an NSF-53 rated filter element may comprise multiple tightly packed filter elements 55 that provided substantial resistance to water flow. Consequently, elevated pressures may be expected as the filter assembly 59 is lowered into the bottle. In high pressure situations, various design alternatives are available. For example, a tighter fit between bottom element 56 and the inner surface of bottle 30 and/or between top element 53 and the inner surface can limit the surface area of gasket and seals exposed to the elevated pressure. In another example, seals and gaskets may have multiple fins (e.g. a U seal or V seal) that improve the reliability of the sealing mechanism by preventing leakage from bottom to top elements 56 and 53 respectively.

As depicted, elements 53, 54 and 56 of the filter assembly 59 each comprise a generally planar surface that includes a number of radially oriented perforations, such as the depicted radially disposed slots 530, that conduct fluid through the filter assembly 59. Some embodiments use other configurations of perforations including differently oriented slots, holes or some combination of both slots and holes. Some embodiments provide a composite surface that can include a wire gauze and/or a permeable material. Different elements of the filter assembly 59 can use combinations of surface materials, different surface structures and/or different channels, holes and/or slots to conduct fluid through the assembly 59.

Figure 6:
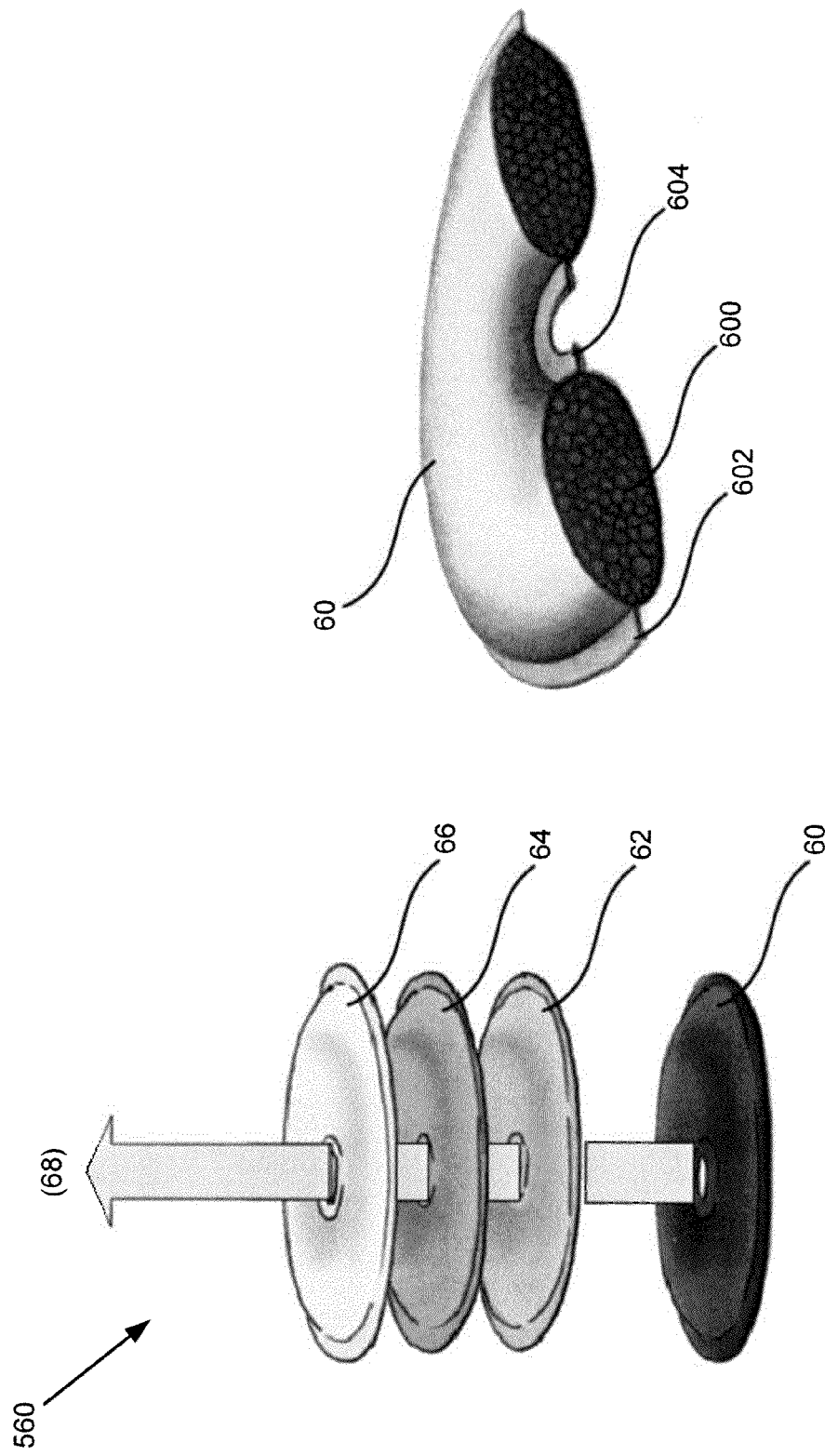
FIG. 6 illustrates an example of the structure of filter components that can be stacked within a filter element of the present invention.

FIG. 6 illustrates filter components 550 (see also, FIG. 5B) that can be stacked within a filter element such as element 55. Components 60, 62, 64 and 66 can be stacked one upon the other within the filter element 55. Each of these components 60, 62, 64 and 66 may be oversized in order to ensure a reliable seal with the walls of filter element 56. As shown in the cross-sectional view of component 60, the component 60 comprises a filter material 600 packed within a permeable container that is characterized by ribs 602 and 604 that are typically impermeable and provided edge seals for the component 60. While filter element can be filled entirely with a solid or packed filter material, the arrangement depicted in FIG. 6 offers an ability to perform multi-stage filtering. For example, a first filter component 60, relative to fluid flow 68, may block passage of particulate matter, second component 62 may have a pore size calculated to block microbes, third component 64 may remove chemicals using, for example, activated carbon and a fourth element 66 may infuse flavor into the fluid.

While the filter element 55 and filter components 60, 62, 64 and 66 are depicted as annular in shape, that many embodiments secure the filter element 55 to stem 52 at a top element 51 and, filter components 60, 62, 64 and 66 and/or filter element 55 can be cylindrical. It will be appreciated that certain advantages accrue from using non-annular filter components 60, 62, 64 and 66 including a reduction in hydrostatic pressure required to support fluid flow 68, improved throughput and less complex sealing mechanisms.

Figure 7:
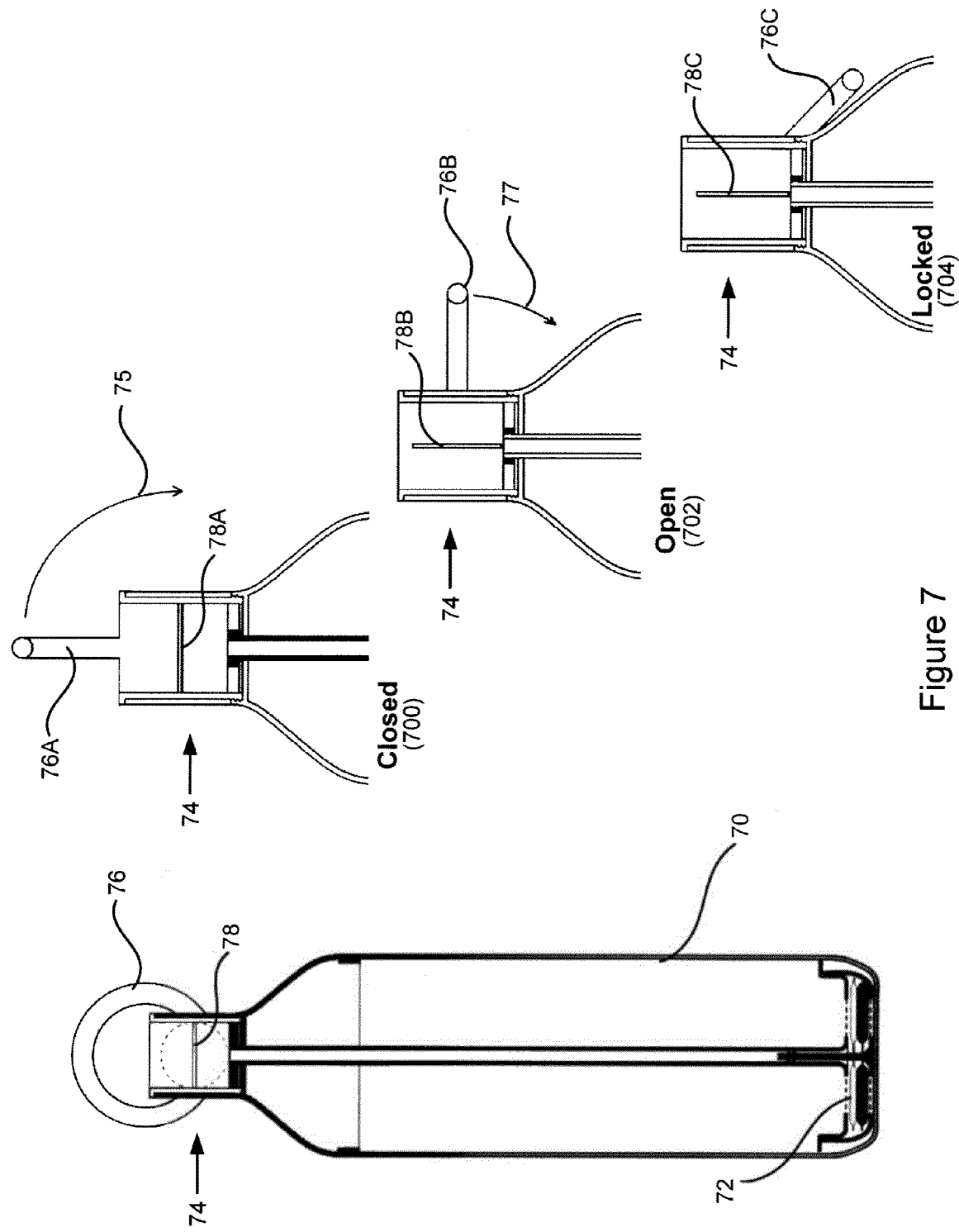
FIG. 7 depicts certain operational aspects of a bottle constructed according to certain aspects of the present invention.

FIG. 7 depicts a bottle 70 that comprises a multi-function ring 76 that serves to draw a filter element 72 along the axis of the bottle 70 and may additionally be used to lock a stopper assembly 74 and/or operate a valve 78 that permits a user to drink the contents of the bottle 70. FIG. 7 depicts the example of a valve 78 and ring 76 in closed 700, open 702 and open/locked 704 positions. In closed configuration 700, ring 76A may be in located in a generally vertical plane to allow the ring 76A to be used for pulling/pushing the stopper mechanism 74 along the axis of bottle 70 or for carrying the bottle 70 on a hook, string, etc. Note that, in closed configuration 700, the stopper mechanism may be locked by, for example rotating the ring 76 through a predetermined angle as shown at 76A. To open the valve 78B, the ring 76B may be rotated as shown at 75. Further rotation 77 of the ring to position 76C may lock the valve 78C in an open position.

Figure 8:
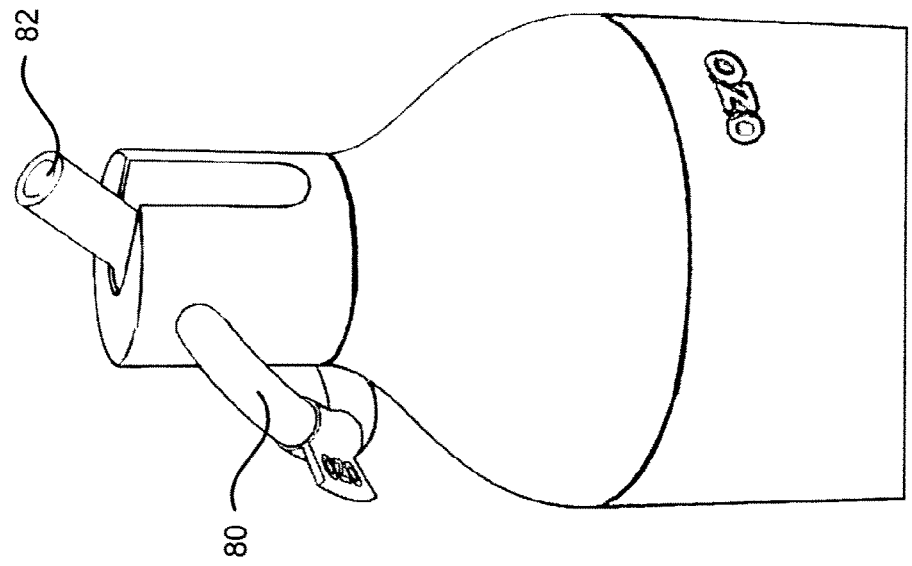
FIG. 8 shows an embodiment of the invention that includes a drinking straw.
Figure 8:
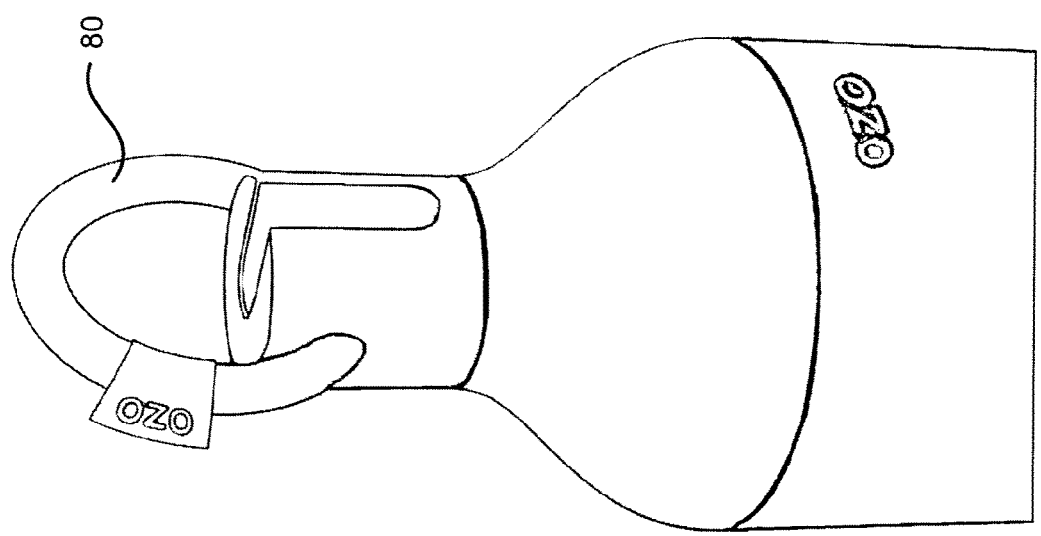
Figure 9B:
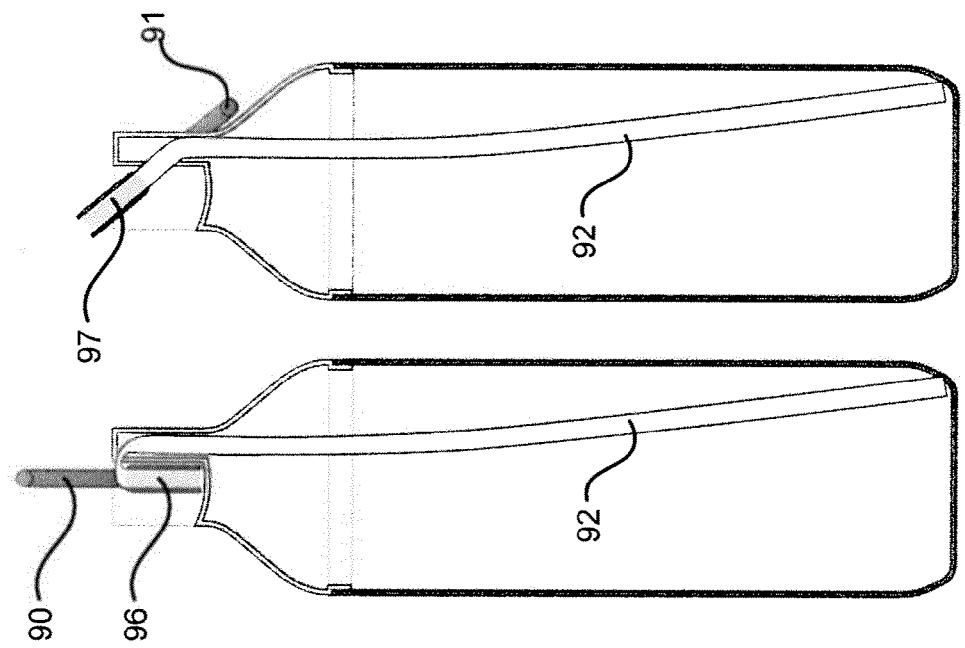
FIGS. 9A and 9B depict mechanisms for managing a drinking straw according to certain aspects of the invention.
Figure 9A:
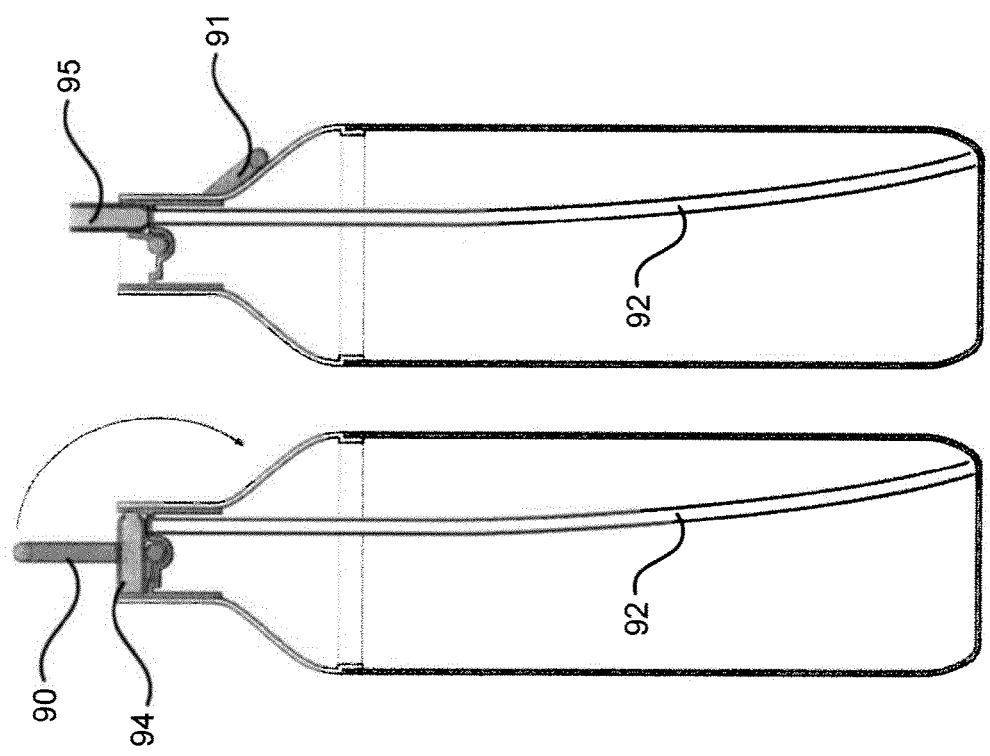

It will be appreciated that variations on the theme of FIG. 7 may be used as desired. For example, FIG. 8 shows an embodiment in which the ring-locked position 76C of FIG. 7 exposes a drinking straw 82 coupled to ring 80. FIGS. 9A and 9B show alternate mechanisms by which a straw 80 may be presented. In FIG. 9A, straw end 94 is rotated from rest position (when ring 90 is in a vertical position) to position 95 when ring is rotated to locked position 91. Raised straw end 95 is coupled to an internal straw 92 inside the bottle. In FIG. 9B, straw end 96 is rotated from rest position (when ring 90 is in a vertical position) to position 97 when ring is rotated to locked position 91. When straw end 96 is in rest position, attached internal straw 92 is pinched shut.

Figure 10A:
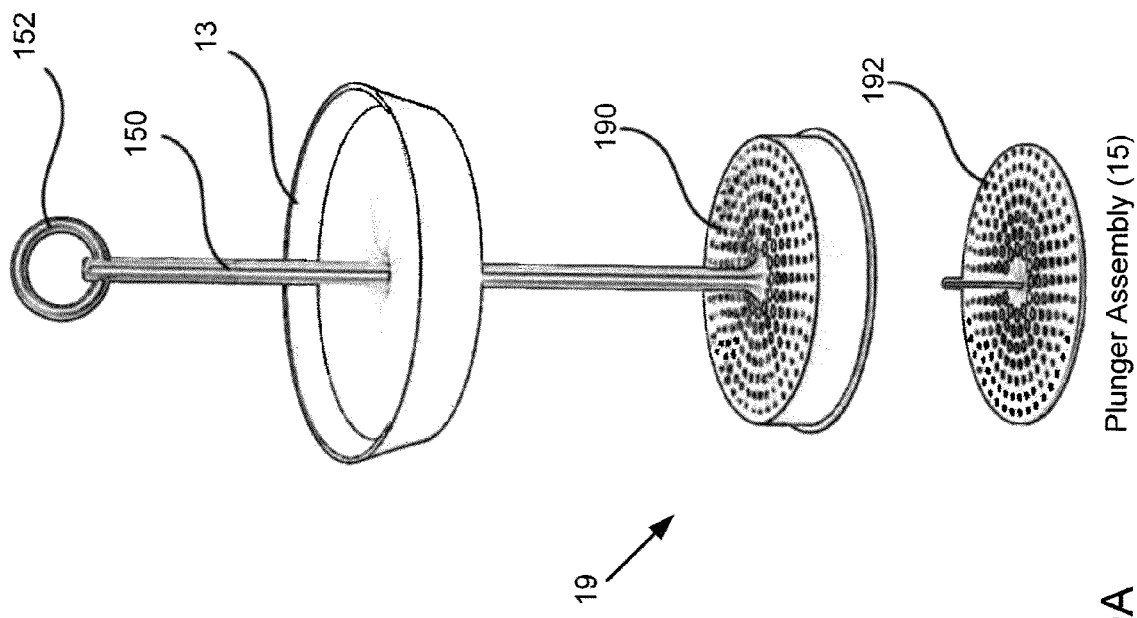
FIGS. 10A and 10B shows a pitcher in one embodiment of the invention.
Figure 10A:
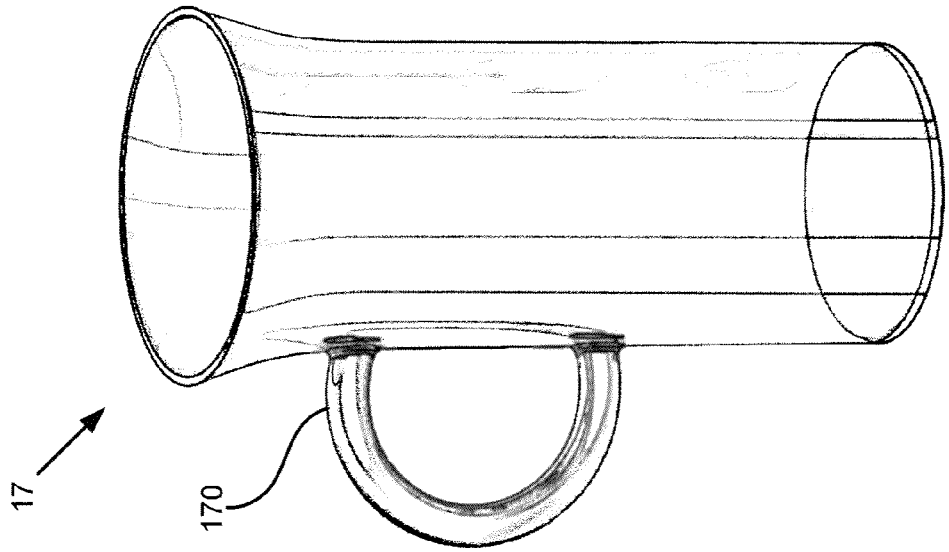
Figure 10B:
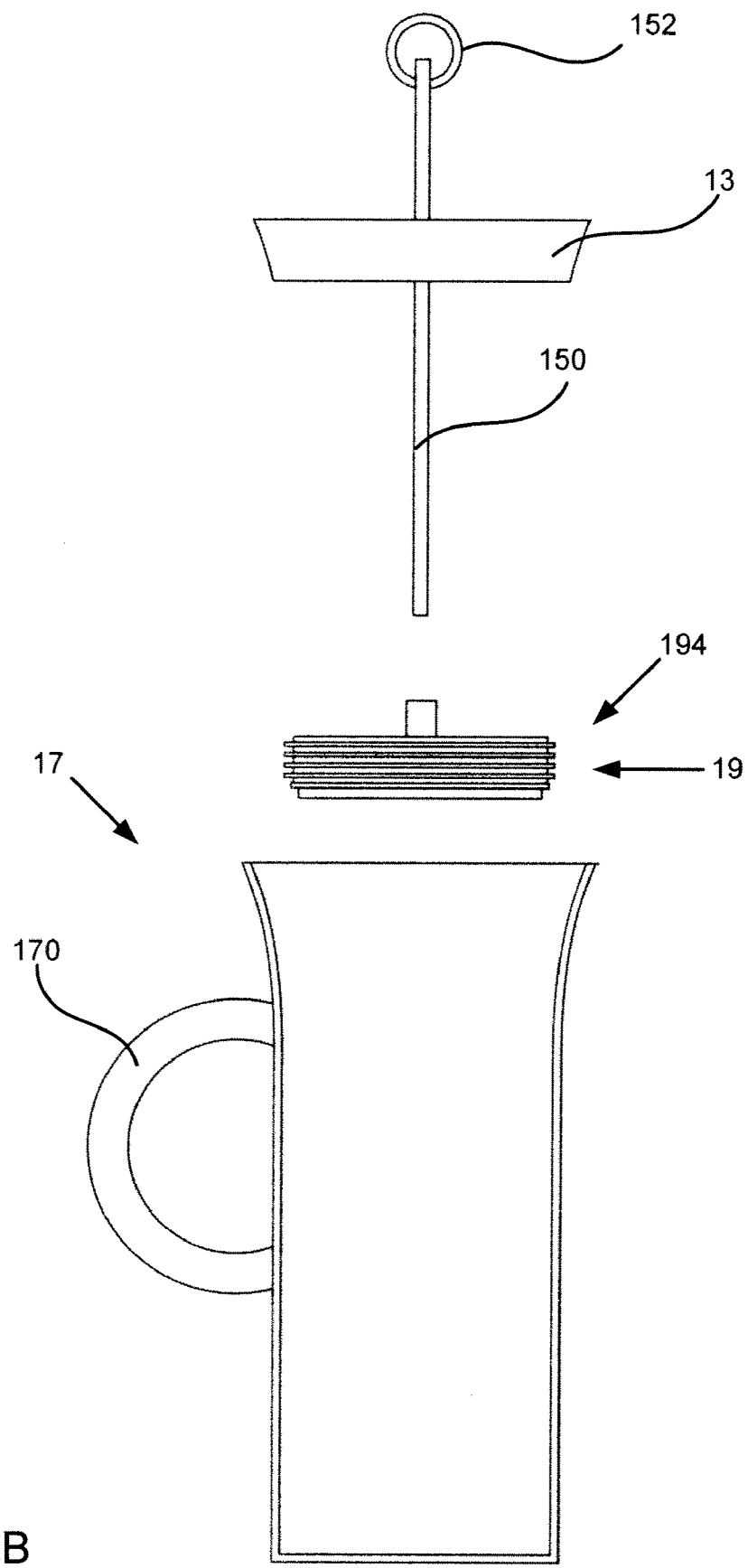

FIGS. 10A and 10B shows the pitcher 11 of FIG. 1, separated into major functional components. In FIG. 10A, pitcher 11 comprises a vessel 17 into which a plunger assembly may be inserted. The principles of operation are similar to those described above in relation to bottle containers. The pitcher 11 can purify water through manual operation. An integrated handle 170 facilitates easy pouring and storage within a refrigerator, for example. The pitcher 11 comprises a vessel that can be made from glass, and a manually fed press plunger assembly 15. The press plunger 15 is supported along the circumference of filter assembly 19 and along the moving shaft 150 of the plunger, typically by the lid component 13. Water is filtered when the plunger 15 is manually pressed down into the vessel and the filter assembly 19 passes the water through the filter. Filter assembly 19 comprises at least an upper element 190, a lower element 192 and one or more filter pods (not shown). By supporting the plunger in two locations, a gasket along the circumference of the filter assembly 19 is able to maintain a constant seal against the wall of the vessel 17 resulting in an extremely pure level of filtration.

In FIG. 10B, filter element 19 is shown in assembled form. The filter element 19 depicted has a plurality of fins 194 provided as a gasket element or attached to the outer circumference of upper element 190 and/or lower element 192.

Certain embodiments of the invention comprise methods for operating the above-described personal filtration systems that allow users to filter water without the need for a powered pump. FIG. 11 shows a procedure for filtering water using a bottle, although the general principles of operation apply equally to other embodiments, such as pitchers and carafes. Referring to the example of FIG. 11, in a system comprising stainless steel vessel 110, vessel top 112 and a manually fed press plunger 114 having a shaft 116 and a filter assembly 118. As described above, the press plunger 114 is supported at two locations, namely along the circumference of a filter assembly 118 and along the moving shaft of the plunger 116, typically located at the mouth of the bottle. By supporting the plunger in two locations, the gasket along the circumference of the filter assembly is able to maintain a constant and consistent seal against the wall of the vessel. At step 1, the plunger 114 is raised from the vessel 110 and vessel top 112. At step 2 the vessel top 112 and complete plunger is removed from the vessel. Optionally, or as necessary, the filter materials within filter element 118 is replaced or replenished. At step 2, water can be added to the vessel 110. The vessel top 112 and press plunger 114 are reattached to the vessel 110. Then at step 3, a force applied to the press plunger 114 causes the filter element 118 to be driven through the water to the bottom of the vessel 110. The water assign through the filter toward the top of the vessel 110 is filtered by filter pods in filter assembly 118. When the plunger 114 is returned to its lowest (rest) level, the water in the vessel is available for consumption. The result is an extremely pure level of filtration.

As noted above, filtration assembly 118 may form a cage that holds one or more optional pods that contain material to be added or infused to the purified water—i.e. after filtration. These optional pods can add minerals and flavors to the water according to the taste of the consumer. For example, a pod may contain one or more of minerals and fruit essence. The bottle is filled with potable water and the filter apparatus is inserted into the top of the bottle where a gasket around the top of the cage forms a seal against the interior of the bottle. The filter cage is then pushed to the bottom of the bottle and water is forced through the filter pods and the filtered water remains stored in the bottle until use. The seal around the periphery of the cage against the interior of the bottle is maintained to prevent water from bypassing the filter. Although a bottle and cage are described as comprising stainless steel, other materials may be used in the construction.

In certain embodiments, filter pods are constructed of activated charcoal encased in particulate-filtering paper. Vitamins, minerals, flavors and other additives are typically provided in water soluble form that provide a desired dosage per bottle of filtered water. For example, the dosage may be calculated to meet or exceed recommended daily intakes of nutrients.

Additional Descriptions of Certain Aspects of the Invention

The foregoing descriptions of the invention are intended to be illustrative and not limiting. For example, those skilled in the art will appreciate that the invention can be practiced with various combinations of the functionalities and capabilities described above, and can include fewer or additional components than described above. Certain additional aspects and features of the invention are further set forth below, and can be obtained using the functionalities and components described in more detail above, as will be appreciated by those skilled in the art after being taught by the present disclosure.

Certain embodiments of the invention provide a container for storing, filtering and drinking fluids. In some of these embodiments, the container has an integrated filtration system. Some of these embodiments comprise a substantially cylindrical vessel that has an inner surface, an outer surface and an opening. Some of these embodiments comprise a pressing assembly. In some of these embodiments, the pressing assembly includes a stopper. In some of these embodiments, the pressing assembly includes a filtration assembly. In some of these embodiments, the pressing assembly includes a rod having a top end that is attached to the stopper and a bottom end that is releasably attached to the filtration assembly. Some of these embodiments comprise a vessel top configured to receive the pressing assembly. In some of these embodiments, the rod of the pressing assembly is slidably attached to a bearing of the vessel top. In some of these embodiments, the filtration assembly comprises a chamber that receives a filtration element and a gasket that maintains a seal between the inner surface of the vessel and an outer perimeter of the filtration assembly. In some of these embodiments, the orientation of the rod is controlled by gasket and by the bearing. In some of these embodiments, a chemical dissolved in the water stored in the vessel is removed when the pressing assembly is forced through the vessel. In some of these embodiments, the vessel top has a first opening that mates with the opening of the vessel and a second opening that is narrower than the first opening. In some of these embodiments, the second opening receives the stopper when the pressing assembly has traversed a length of the vessel.

Certain embodiments of the invention provide a container for fluids. In some of these embodiments, the container has an integrated filtration system. Some of these embodiments comprise a substantially cylindrical vessel that has an inner surface, an outer surface and an opening. Some of these embodiments comprise a pressing assembly. In some of these embodiments, the pressing assembly includes a stopper. In some of these embodiments, the pressing assembly includes a filtration assembly. In some of these embodiments, the pressing assembly includes a rod having a top end that is attached to the stopper and a bottom end that is releasably attached to the filtration assembly. Some of these embodiments comprise a vessel top configured to receive the pressing assembly such that the rod of the pressing assembly is slidably attached to a bearing of the vessel top. In some of these embodiments, the filtration assembly comprises a chamber that receives a filtration element and a gasket that maintains a seal between the inner surface of the vessel and an outer perimeter of the filtration assembly. In some of these embodiments, the orientation of the rod is controlled by the gasket and by the bearing. In some of these embodiments, a chemical dissolved in the water stored in the vessel is removed when the pressing assembly is forced through the vessel.

In some of these embodiments, the vessel top has a first opening that mates with the opening of the vessel and a second opening that is narrower than the first opening, and wherein the second opening receives the stopper when the pressing assembly has traversed a predetermined length of the vessel. In some of these embodiments, the filtration element comprises activated carbon. In some of these embodiments, the filtration assembly receives one or more pods that add a substance to water filtered by the filtration element when the pressing assembly is forced through the vessel. In some of these embodiments, the one or more pods include a pod that adds a fruit essence to the water filtered by the filtration element. In some of these embodiments, the one or more pods include a pod that adds a nutrient to the water filtered by the filtration element. In some of these embodiments, the nutrient comprises a mineral.

In some of these embodiments, water filtered by the filtration element when the pressing assembly is forced through the vessel meets NSF/ANSI Standard 42. In some of these embodiments, water filtered by the filtration element when the pressing assembly is forced through the vessel meets NSF/ANSI Standard 53. In some of these embodiments, the stopper includes a valve operated by a ring. In some of these embodiments, the ring rotates about an axis of the bottle between a first and second position. In some of these embodiments, the valve is closed when the ring is in the first position and open when the ring is in the second position. In some of these embodiments, the ring is used to operate the pressing assembly when oriented in the first position. In some of these embodiments, the gasket comprises an element having a plurality of fins. In some of these embodiments, the gasket comprises one or more of a U ring and a V ring. In some of these embodiments, the gasket comprises one or more of a chevron packing seal and an O ring. In some of these embodiments, the container is a pitcher. In some of these embodiments, the container is a bottle.

In some of these embodiments, the gasket is selected to withstand a hydrostatic force of at least 1 pound per square inch. In some of these embodiments, the gasket is selected to withstand a hydrostatic force of at least 2 pounds per square inch. In some of these embodiments, the gasket is selected to withstand a hydrostatic force of at least 3 pounds per square inch. In some of these embodiments, the gasket is selected to withstand a hydrostatic force of at least 4 pounds per square inch. In some of these embodiments, the gasket is selected to withstand a hydrostatic force of at least 5 pounds per square inch. In some of these embodiments, the gasket is selected to withstand a hydrostatic force of at least 25 pounds per square inch.

Certain embodiments of the invention provide methods for filtering water in a portable container such as those containers described above. In some of these embodiments, the container has a substantially cylindrical vessel. In some of these embodiments, the container has a pressing assembly that includes a stopper connected to a filter by a rod. Some of these embodiments comprise providing a filter element within the filter for purifying water to at least NSF/ANSI Standard 42. Some of these embodiments comprise providing a body of water to be filtered within the vessel. Some of these embodiments comprise inserting the filter element into a top opening of the vessel. Some of these embodiments comprise pressing the filter toward the bottom of the vessel using at least one of the stopper and a portion of the rod to apply pressure to the pressing assembly. In some of these embodiments, the pressing causes the unfiltered water to pass through the filter, thereby obtaining filtered water. In some of these embodiments, the filtered water collects in an upper portion of the vessel. In some of these embodiments, providing an opening through the stopper for consumption of the filtered water. In some of these embodiments, a gasket element attached to the filter prevents bypass of the filter by unfiltered water.

In some of these embodiments, the filter element purifies water to at least NSF/ANSI Standard 53. Some of these embodiments comprise providing one or more pods within the filter. In some of these embodiments, each of the one or more pods includes an additive. In some of these embodiments, the additive comprises a nutrient. In some of these embodiments, the additive comprises a mineral. In some of these embodiments, the additive comprises a flavor. In some of these embodiments, the step of pressing causes the additive to be infused into the filtered water.

Although the present invention has been described with reference to specific exemplary embodiments, it will be evident to one of ordinary skill in the art that various modifications and changes may be made to these embodiments without departing from the broader spirit and scope of the invention. Accordingly, the specification and drawings are to be regarded in an illustrative rather than a restrictive sense.

What is claimed is:

1. A bottle for storing drinking fluids, the bottle having an integrated filtration system, wherein the bottle comprises:
    a substantially cylindrical vessel body that has an inner surface and an outer surface;
    a pressing assembly that includes:
        a stopper, said stopper optionally defining a fluid passage therein;
        a filtration assembly; and
        a rod having a top end that is attached to the stopper and a bottom end that is releasably attached to the filtration assembly; and
    a neck portion whose cross-sectional area increases from a sole opening at its upper end, until it equals the cross-sectional area of said cylindrical vessel body, said neck portion receiving the pressing assembly such that the rod of the pressing assembly is slidably attached to a bearing of the neck portion, said bearing being located at a lower end of said neck portion, said neck portion being sealingly attachable to said cylindrical vessel body, an annular passage of sufficient size to permit water flow is defined between a sidewall of said sole opening and said rod;
    wherein:
        the filtration assembly comprises a chamber that receives a filtration element and a gasket that maintains a seal between the inner surface of the vessel body and an outer perimeter of the filtration assembly;
        the stopper sealingly engages said sole opening when in a completely lowered position;
        the orientation of the rod within the vessel is controlled by the gasket and by the bearing; and
        a contaminant present in the water stored in the vessel is removed when the pressing assembly is forced through the vessel body, thereby producing purified water which may then exit said bottle through said annular passage when said stopper is not sealingly engaged in said sole opening, or through said optional fluid passage in said stopper when said stopper is sealingly engaged in said sole opening.

2. The bottle of claim 1, wherein the cylindrical vessel body and the neck portion are threadably attachable.

3. The bottle of claim 1, wherein the filtration element comprises activated carbon.

4. The bottle of claim 1, wherein the filtration assembly receives one or more pods that add a substance to water filtered by the filtration element when the pressing assembly is forced through the vessel.

5. The bottle of claim 4, wherein the one or more pods includes a pod that adds a fruit essence to the water filtered by the filtration element.

6. The bottle of claim 4, wherein the one or more pods includes a pod that adds a nutrient to the water filtered by the filtration element.

7. The bottle of claim 6, wherein the nutrient comprises a mineral.

8. The bottle of claim 1, wherein the gasket is selected to withstand a hydrostatic force of at least 25 pounds per square inch.

9. The bottle of claim 1, wherein the gasket comprises one or more of a chevron packing seal and an O ring.

10. The bottle of claim 1, wherein the gasket comprises an element having a plurality of fins.

11. The bottle of claim 10, wherein the gasket comprises one or more of a U ring and a V ring.

12. The bottle of claim 10, wherein the gasket is selected to withstand a hydrostatic force of at least 5 pounds per square inch.

* * * * *